(12) United States Patent
Takada et al.

(10) Patent No.: US 6,368,746 B1
(45) Date of Patent: Apr. 9, 2002

(54) MOLDED SOLID ELECTROLYTE, MOLDED ELECTRODE AND ELECTROCHEMICAL ELEMENT

(75) Inventors: Kazunori Takada, Tsukuba; Kazuya Iwamoto, Sakai; Shigeo Kondo, Hirakata; Yasumasa Takeuchi, Yokohama; Naoshi Yasuda, Kawagoe; Fusazumi Masaka, Tsukuba, all of (JP)

(73) Assignees: Matsushita Electric Industrial Co., Ltd., Osaka; JSR Corporation, Tokyo, both of (JP)

( * ) Notice: Subject to any disclaimer, the term of this patent is extended or adjusted under 35 U.S.C. 154(b) by 0 days.

(21) Appl. No.: 09/555,888
(22) PCT Filed: Oct. 12, 1999
(86) PCT No.: PCT/JP99/05623
  § 371 Date: Jun. 8, 2000
  § 102(e) Date: Jun. 8, 2000
(87) PCT Pub. No.: WO00/24077
  PCT Pub. Date: Apr. 27, 2000

(30) Foreign Application Priority Data
Oct. 16, 1998 (JP) .......................................... 10-295844

(51) Int. Cl.$^7$ .......................... H01M 10/36; H01M 4/62
(52) U.S. Cl. ........................ 429/192; 429/217; 429/208; 254/182.1
(58) Field of Search .................................. 429/192, 217, 429/254, 208; 252/182.1

(56) References Cited

U.S. PATENT DOCUMENTS

| 5,262,255 A | 11/1993 | Ito et al. |
| 5,789,107 A | * 8/1998 | Okada et al. ................ 429/192 |
| 6,221,941 B1 | * 4/2001 | Strauss et al. .............. 524/176 |

FOREIGN PATENT DOCUMENTS

| JP | 44-32426 | 12/1969 |
| JP | 5-13100 | 1/1993 |
| JP | 6-215761 | 8/1994 |
| JP | 11-86899 | 3/1999 |

* cited by examiner

Primary Examiner—David W. Wu
Assistant Examiner—K. C. Egwim
(74) Attorney, Agent, or Firm—McDERMOTT, WILL & EMERY

(57) ABSTRACT

A molded solid electrolyte, a molded electrode and an electrochemical device which contain a polymer composition consisting of 50 to 100 wt % of 1,2-polybutadiene having a 1,2-vinyl content of 70% or more and a crystallinity of 5 to 50%, and 0 to 50 wt % of polar rubber. According to the present invention, it becomes possible to obtain a molded solid electrolyte provided with high ionic conductivity and high workability, or a molded electrode having high electrode activity, and it is also possible to obtain an electrochemical device showing excellent activating properties by using the molded solid electrolyte and the molded electrode.

13 Claims, 6 Drawing Sheets

MOLDED SOLID ELECTROLYTE, MOLDED ELECTRODE AND ELECTROCHEMICAL ELEMENT

TECHNICAL FIELD

The present invention relates to an electrochemical device, a molded solid electrolyte and a molded electrode used for the electrochemical device. More specifically, the present invention relates to a molded article holding an electrolyte material and an electrode material, which constitute the electrochemical device by adding a polymer composition to materials which constitute these electrochemical devices, and an electrochemical device constituted by using these molded articles.

BACKGROUND ART

An electrochemical device such as a battery is composed of an electrolyte layer where ion transfer takes place and an electrode layer where donation and acceptance of an electron to an ion are conducted together with the ion transfer. To these electrolyte layer and electrode layer, a polymer composition is added for the following purposes.

(1) Addition to the Electrolyte Layer

In general, an electrolyte is a liquid containing a solvent and a supporting salt dissolved in the solvent, and a container is required to contain the liquid, which makes it difficult to reduce the size and thickness of an electrochemical device. In order to solve the problem, all-solid state electrochemical devices, which use a solid electrolyte instead of a conventional liquid electrolyte, have been researched.

Above all, a lithium battery, which is an electrochemical device, is vigorously researched as a battery which can provide high energy density because lithium is a substance having a small atomic weight and large ionization energy, and has come to be widely used as a power source for a portable appliance.

Also, with the widespread use of lithium batteries, there has been a growing interest in the safety of the batteries because of an increase in internal energy due to an increase in active material content and also because of an increase in organic solvent content, which is a combustible material used in the electrolyte.

As a method of securing the safety of the lithium batteries, it is extremely effective to use a solid electrolyte, which is an incombustible material, instead of an organic solvent electrolyte. Therefore, it is important for a lithium battery to employ a solid electrolyte in order to secure high safety as well as to achieve the above-mentioned reduction in size and thickness.

As the solid electrolytes having lithium ion conductivity used in these batteries, lithium halide, lithium nitride, lithium oxygen acid salt and their derivatives are known. In addition, it is known that amorphous solid electrolytes of sulfides such as $Li_2S—SiS_2$, $Li_2S—P_2S_5$ and $Li_2S—B_2S_3$ having lithium ion conductivity, and lithium ion conductive solid electrolytes made by doping lithium halide such as LiI or a lithium salt such as $Li_3PO_4$ to these glasses show high ionic conductivity of $10^{-4}$ to $10^{-3}$ S/cm or higher.

Unlike these inorganic solid electrolytes, polymer solid electrolytes comprising organic materials are obtained by evaporating a solvent from a solution containing a lithium salt and an organic polymer compound. This polymer solid electrolyte has excellent processibility in that it is formed into a thin film easier than an inorganic solid electrolyte and that the resultant solid electrolyte thin film has flexibility.

Recently, as a solid electrolyte having flexibility or rubber elasticity, a novel solid electrolyte named polymer in salt type compring an inorganic salt and a polymer compound, which has lithium ion conductivity of extremely higher density than the above-mentioned polymer solid electrolyte has been suggested by C. A. Angell et al. (C. A. Angell, C. Liu and E. Sanchez, Nature, vol. 632, (1993) 137).

In an electrochemical device using a liquid electrolyte, too, a porous polymer composition is usually used as a separator in the electrolyte layer. The separator is required to prevent an electric contact between the electrodes mechanically, to have excellent liquid retentivity for retaining the liquid electrolyte and to be chemically stable in the electrochemical device. Since it is used in contact with the electrodes, the separator is further required to be electrochemically stable.

(2) Addition to the Electrode Layer

The electrode is constituted by molding an electrode active material and by connecting it to a current collector. When the electrode active material is molded merely by a pressure molding method, the aggregation force between electrode active material particles is mainly van der Waals only. In an ordinary electrochemical device, however, a liquid is used as the electrolyte and, therefore, when the molded electrode constituted by the pressure molding method only is immersed in a liquid electrolyte, the liquid molecules are adsorbed on the surface of the electrode active material particles. As a result, the aggregation force between the active material particles decreases and the electrode active material particles drop off from the molded electrode into the liquid electrolyte, making it impossible to keep the shape of the molded electrode. Therefore, in order to improve the molding property of the electrode, a polymer composition is generally added as a binder to t he molded electrode.

The polymer composition is added to the electrolyte layer or electrode layer of an electrochemical device for the above-mentioned purposes; however, these prior arts have the following problems.

(3) Problems Involved in the Addition to the Electrolyte Layer

The above-mentioned inorganic solid electrolyte comprises ceramic or glass, and in applying to a battery, it is generally used as a pellet obtained by pressure molding pulverized solid electrolyte powder. However, there is a problem that the obtained pellet has poor workability due to the hardness and brittleness, thereby preventing the electrolyte layer from decreasing in the thickness and increasing in the area.

On the other hand, the solid electrolyte comprising organic materials has low ionic conductivity of $10^{-4}$ S/cm or less at room temperature, which is not sufficient as a practical lithium battery electrolyte. In order to solve this problem, a polymer solid electrolyte having ionic conductivity improved by adding a plasticizer has been proposed. However, a plasticizer is inherently combustible, which reversely causes a problem that adding the plasticizer decreases the transport number of lithium ions or decreases reactivity with a lithium anode. Whether a plasticizer is added or not, it is hard to say that these organic solid electrolytes have sufficient performance as the lithium battery electrolytes.

The above-mentioned "polymer in salt" type solid electrolyte has low conductivity not exceeding $10^{-4}$ S/cm, so it is impossible to say that the electrolyte has sufficient ionic conductivity as the lithium battery electrolyte. When an ambient temperature molten salt (a salt in a liquid state at room temperature) such as $AlCl_3$—$LiBr$—$LiClO_4$ is used as an inorganic salt, it shows high ionic conductivity, but is likely to cause an electrochemical reduction of aluminum, so it cannot be said to be suitable for the lithium battery electrolyte.

(4) Problems Involved in the Addition to the Electrode Layer

As mentioned above, a molded electrode is constituted by adding a polymer composition as a binder to an electrode active material. In general, a polymer compound is electrically insulating and likely to disturb ion transfer, and interferes electrochemical reactions caused on the electrode/electrolyte interface and ion dispersion in an electrode. Consequently, there is a problem that when the mixing ratio of the polymer compound is increased to enhance the processibility, operating performance of the electrochemical device tends to decrease.

The molded electrode is obtained as follows. That is, a slurry is obtained by mixing a mixture of an electrode active material, a binder and an electron conductive material added when needed to improve the electron conductivity in an electrode in a dispersing medium. Then, the slurry is filled into or applied onto a current collector and the dispersing medium is evaporated to obtain the molded electrode. In order to improve the applicability and filling property of the slurry, it is preferable that the polymer composition used as the binder is soluble to the dispersing medium used.

When a solid electrolyte is used as the electrolyte, electrode active material particles are prevented from separating and dropping into the electrolyte. However, when the molded electrode is a pressure-molded article merely comprising an electrode active material, or a pressure-molded article comprising a mixture of an electrode active material and a solid electrolyte in order to expand the reacting surface area, there is a problem that the molded electrode becomes hard and brittle with poor workability, making it difficult to manufacture an electrochemical device having a large area.

Furthermore, when the solid electrolyte is used as the electrolyte, the contact interface between the electrolyte and the electrode active material becomes a solid/solid interface, so that the contact surface area between the electrode active material and the electrolyte becomes smaller than in the case where a liquid electrolyte is used. Consequently, electrode reaction resistance tends to be large. When the electrically insulating polymer composition is added to further improve the processibility, the tendency becomes further remarkable. For this, there is a problem that the rate of the electrode reaction is facilitated to decrease.

Taking a lithium battery as an example of the electrochemical device, as an electrode active material, a lithium cobalt oxide ($Li_xCoO_2$) is used for the positive electrode and graphite or the like is used for the negative electrode. Since they are obtained in a powdery form, as mentioned above, there has been a problem that when used in a lithium battery as the molded electrode made by only pressure molding, the liquid electrolyte penetrates into the electrode constituting particles to cause the electrodes to swell, which makes them hard to keep their shapes and tends to lose the electrical contact.

In addition, $Li_xCoO_2$ has a structure where triangular lattices of oxygen, lithium and cobalt are accumulated in the order of O—Li—O—Co—O—Li—O, and lithium ions exist between the $CoO_2$ layers. Moreover, due to an electrochemical oxidation-reduction reaction in the lithium ion conductive electrolyte, the lithium ions move in and out between the $CoO_2$ layers. As a result, the degree of the electrical interaction between the $CoO_2$ layers changes, thereby causing extension and shrinkage between the layers to change the volume of the electrodes. This has a problem that the bond between particles, which constitute the electrode, tends to be lost with every repetition of charging and discharging cycle, thereby decreasing the capacity with the charging and discharging cycles.

In the above, as the electrode active material, $Li_xCoO_2$ has been explained. As materials conventionally used as the lithium battery active materials or as the active materials expected to be used in the future, there are transition metal oxides such as $Li_xNiO_2$, $Li_xMnO_2$ and $MnO_2$, transition metal disulfides such as $Li_xTiS_2$, a graphite intercalation complex and fluorinated graphite. When these materials are used, similar problems are caused.

When a solid electrolyte is used as the electrolyte, as described above, the contact area between the solid electrolyte and the electrode active material tends to be small. Therefore, when there is a change in the volume of the electrode active material due to the charging and discharge of the battery, the bond between the active material and the electrolyte tends highly to be lost. Furthermore, since all the battery materials are made from hard solid materials, there is no elastic member in the battery to absorb a volume change in the electrode active material during charging and discharging, which may cause a dimensional change of the battery, or resultant sealing failure at a battery sealing unit.

An object of the present invention is to solve these problems and to provide a molded solid electrolyte, which shows excellent electrochemical properties including high ionic conductivity, and excels in workability with excellent flexibility.

Another object of the present invention is to provide a molded electrode, which can constitute an electrochemical device showing excellent operating properties, and which excels in processibility and workability.

Further another object of the-present invention is to solve these problems resulting from a volume change in the electrode active material while an electrochemical device operates, thereby providing an electrochemical device which operates in a stable manner.

DISCLOSURE OF THE INVENTION

The molded solid electrolyte of the present invention comprises a polymer composition consisting of 50 to 100 wt % of 1,2-polybutadiene having a 1,2-vinyl bond content of 70% or more and a crystallinity of 5 to 50% and 0 to 50 wt % of a polar rubber, and a solid electrolyte.

The molded electrode of the present invention is composed of an electrode active material and the above polymer composition.

The electrochemical device of the present invention comprises a pair of electrodes and an electrolyte layer, and at least one of said pair of electrodes and said electrolyte layer contains said polymer composition.

The 1,2-polybutadiene having a 1,2-vinyl bond content of 70% or more and a crystallinity of 5 to 50% which is one of the main components of the polymer composition of the present invention is a straight-chain or branched multi-block copolymer (hereinafter referred to as "1,2-polybutadiene copolymer") having a crystalline syndiotactic 1,2-polybutadiene block and a amorphous rubber-like 1,2-polybutadiene block in the trunk chain.

Polar rubber, which is another component of the polymer composition is a polar group-containing rubber (hereinafter referred to as "polar rubber") containing a cyano group, a carboxyl group, an alkoxycarbonyl group, an alkyl halide group or the like as a polar group, and can be used alone or in combination of two or more.

In this case, it is preferable to use a lithium ion conductive solid electrolyte as the solid electrolyte.

Alternatively, an amorphous solid electrolyte may be used as the solid electrolyte.

In addition, as the lithium ion amorphous solid electrolyte, one mainly composed of a sulfide is used, and above all, one containing silicon is used.

The molded solid electrolyte can include an electrically insulating structural member.

It is preferable to contain a lithium ion conductive inorganic solid electrolyte.

As the lithium ion conductive inorganic solid electrolyte, an amorphous one mainly composed of a sulfide is preferably used.

Moreover, the molded electrode preferably contains a structural member, and the structural member is preferably electrically conductive.

BEST MODE FOR CARRYING OUT THE INVENTION

Figure 1:
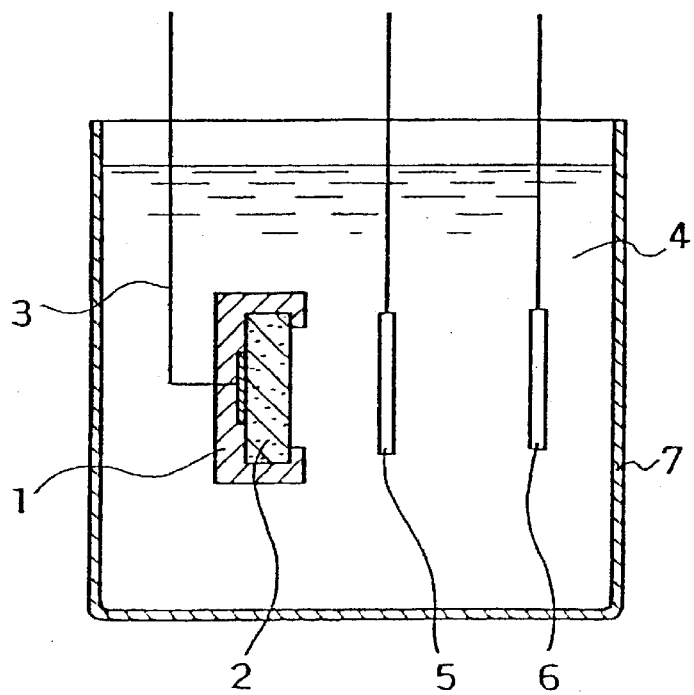
FIG. 1 is a conceptual illustration of a device to evaluate the electrochemical properties of the molded electrode of one example of the present invention.

The inventors of the present invention have found that the use of a polymer composition consisting of 50 to 100 wt % of 1,2-polybutadiene having a 1,2-vinyl bond content of 70% or more and a crystallinity of 5 to 50% and 0 to 50 wt % of a polar rubber, and a solid electrolyte as the polymer composition playing a role as a binder facilitates ion transfer between materials constituting an electrochemical device, such as between inorganic solid electrolyte particles, between electrode active material particles and on the interface between the electrode active material/the electrolyte, and provides a molded solid electrolyte, a molded electrode and the like with high processibility and flexibility so as to improve the workability, and they have completed the present invention.

For example, when a polymer composition is added in order to provide an inorganic solid electrolyte with flexibility, the surface of inorganic solid electrolyte particles is coated with the insulating polymer composition. As a result, the ionic conductivity between the solid electrolyte particles is interfered, and the ionic conductivity of the resultant composite of the ion conductive inorganic solid electrolyte and the polymer composition becomes lowered. However, the use of the polymer composition according to the present invention consisting of 50 to 100 wt % of 1,2-polybutadiene having a 1,2-vinyl bond content of 70% or more and a crystallinity of 5 to 50% and 0 to 50 wt % of a polar rubber as the polymer composition can improve the binding property between the solid electrolyte particles without greatly damaging the ionic conductivity so as to provide the molded article of the solid electrolyte with flexibility.

First, the molded solid electrolyte of the first Example of the present invention will be described. The molded solid electrolyte of the present invention is a molded solid electrolyte characterized by mainly composed of a polymer composition consisting of 50 to 100 wt % of 1,2-polybutadiene having a 1,2-vinyl bond content of 70% or more and a crystallinity of 5 to 50% and 0 to 50 wt % of a polar rubber, and a solid electrolyte.

The 1,2-polybutadiene having a 1,2-vinyl bond content of 70% or more and a crystallinity 5 to 50%, which is one component of the polymer composition of the present invention comprises a multi-block copolymer having a crystalline syndiotactic 1,2-polybutadiene unit which forms a hard segment in the polymer straight chain and an amorphous 1,2-polybutadiene unit which forms a soft segment in the polymer. Changing polymerization conditions makes it possible to obtain 1,2-polybutadiene copolymers which differ in crystallinity, melting point, glass transition temperature and the like.

The 1,2-polybutadiene of the present invention has a crystallinity of 5 to 50%. It has high aggregation force to keep the bonding between a solid electrolyte and electrode active material particles, making it possible to provide a molded solid electrolyte, a molded electrode and the like with high processibility and flexibility with only a small addition amount. The reason for using one having a crystallinity of 5 to 50% is that when it is less than 5%, the aggregation force of the 1,2-polybutadiene copolymer is too lowered to obtain high processibility in the range where a small amount is added to the solid electrolyte, and when it is more than 50%, the hardness increases to lose the flexibility. Furthermore, from a viewpoint that the higher the crystallinity becomes, the larger the tensile strength becomes, but when the crystallinity is more than 40%, the stretch tends to decrease remarkably, it is preferable to use one having a crystallinity of 14 to 40%. Moreover, it is particularly preferable to use one having a crystallinity of 20 to 35%.

Although the amount of 1,2-vinyl bond in the above-mentioned 1,2-polybutadiene may be 70% or more from the viewpoint of obtaining the 1,2-polybutadiene having appropriate crystalline, it is preferably 90 to 98% from the viewpoint of obtaining the 1,2-polybutadiene having excellent tensile property, impact resilience and a compressive permanent strain property.

The 1,2-polybutadiene having a 1,2-vinyl bond content of 70% or more and a crystallinity of 5 to 50% can be produced by a well-known method. For example, it can be produced by the method disclosed in Japanese Laid—Open Patent Application No. 44-32426.

The polar rubber, which is the other component of the polymer composition of the present invention, is used to improve heat resistance or a low-temperature property. To be more-specific, the polar rubber means rubber having a cyano group, a carboxyl group, an alkoxycarbonyl group, a halogen atom, an alkyl halide group or the like as a polar group, for example. As such polar rubber, it is preferable to use one with high polarity and, as the concrete example, there are acrylonitrile butadiene rubber, acrylic rubber, ethylene acrylic rubber, epichlorohydrin rubber, epichlorohydrinoxide rubber, chloroprene rubber, vinylidene fluoride type rubber, or their modified products, which can be used either alone or in combination of two or more kinds within the range not to damage the effects of the present invention. The modified rubber is rubber to which a functional group other than the above-mentioned polar rubber is introduced, and there is exemplified carboxylic acrylonitrile butadiene rubber obtained by ternary-copolymerizing acrylic acid, methacrylic acid or the like as a third component with acrylonitrile butadiene rubber, and by introducing carboxylic acid to the side chain.

Among them, the acrylonitrile butadiene rubber or the modified products thereof are preferable from the viewpoints that they have an effect of improving a low-temperature property by lowering a glass transition temperature, and that they also have good compatibility with the 1,2-polybutadiene having a 1,2-binyl bond content of 70% or more and a crystallinity of 5 to 50%. Furthermore, in the case of the acrylonitrile butadiene rubber, the amount of bonded acrylonitrile is preferably 20 to 55%. This is because when the amount of bonded acrylonitrile (the content ratio of the structural unit deriving from acrylonitrile expressed in a mole ratio) becomes smaller, the glass transition temperature is lowered, and when it is less than 20%, the flexibility of the molded solid electrolyte or the molded electrode decreases. On the other hand, the amount is set at 55% or less because when it is more than 55%, the dynamic property at a low temperature deteriorates.

The ethylene acrylic rubber is preferable because it has an effect of improving heat resistance and also has good compatibility with the 1,2-polybutadiene having a 1,2-vinyl bond content of 70% or more and a crystallinity of 5 to 50%.

The ratio of the 1,2-polybutadiene having a 1,2-vinyl bond content of 70% or more and a crystallinity of 5 to 50%, and the polar rubber in the polymer composition of the present invention is preferably 50:50 to 100:0 by weight. This is because when the ratio of the 1,2-polybutadiene is less than 50 wt %, the aggregation force to keep the bonding between the solid electrolyte particles or the electrode active material particles and the flexibility is deteriorated. Furthermore, from the viewpoint of preventing a decrease in aggregation force at a high temperature or a decrease in flexibility at a low temperature, it is particularly preferable that the ratio of the 1,2-polybutadiene and the polar rubber is 60:40 to 90:10.

As the method of obtaining the polymer composition of the present invention, there are exemplified a method of dissolving the 1,2-polybutadiene having a 1,2-vinyl bond content of 70t or more and a crystallinity of 5 to 50%, and the polar rubber in their respective solvents and mixing them, a method of mixing a pellet of the 1,2-polybutadiene having a 1,2-vinyl bond content of-70% or more and a crystallinity of 5 to 50%, and crumbs of the polar rubber in a fixed ratio and dissolving them with a common solvent and the like. The concentrations of the 1,2-polybutadiene in a 1,2-polybutadiene solution and the polar rubber in a polar rubber solution, respectively, may be 0.5 to 20 wt % from the viewpoint of producing a slurry having good mixture dispersibility between the polymer composition and either the solid electrolyte or the electrode active material.

As the solvent to dissolve the above-mentioned 1,2-polybutadiene having a 1,2-binyl bond content of 70% or more and a crystallinity of 5 to 50% or the polar rubber, it is possible to use dichloroethane, tetrachloroethane, chlorobenzene, chloroform, benzene, toluene, cyclohexane, N-methyl-2-pyrroridon, metacresol, cyclohexanone, acetone, methylethylketone, tetrahydrofuran or the like, for example.

In producing the polymer composition of the present invention, it is possible to add a crosslinking agent such as a peroxide to the 1,2-polybutadiene solution and/or the polar rubber. According to this, for example, when a molded solid electrolyte or a molded electrode described below is produced, a polymer composition having a crosslinking structure can be obtained by a heating treatment.

Then, the solid electrolyte will be described. As a solid electrolytes showing ionic conductivity of $10^{-4}$ S/cm or more at room temperature, those having copper ion conductivity, silver ion conductivity, proton conductivity, fluoride ion conductivity and the like have been found so far. Above all, a solid electrolyte having lithium ion conductivity is drawing attention as an electrolyte for an all-solid state lithium battery. However, a lithium battery which evolves a high voltage comprises a positive electrode showing a strong oxidation force and a negative electrode showing a strong reduction force. Therefore, even if the polymer composition added to the electrolyte layer shows high bonding property, without disturbing the ion transfer, it may be deteriorated due to a contact with the positive electrode or the negative electrode. Since the polymer composition of the present invention consisting of 50 to 10.0 wt % of 1,2-polybutadiene having a 1,2-vinyl bond content of 70% or more and a crystallinity of 5 to 50%, and 0 to 50 wt % of polar rubber is stable against such an oxidation and reduction reaction, the effects become largest when a molded solid electrolyte is constituted with a lithium ion conductive solid electrolyte.

Lithium ion conductive solid electrolyte s are classified into crystalline ones such as $Li_{1.3}Sc_{0.3}Ti_{1.7}(PO_4)_3$ and $Li_{0.2}La_{0.6}TiO_3$, and amorphous ones such as $Li_2S$—$SiS_2$. Many of the crystalline ones have anisotropy in ionic conductivity, and an ion transfers along a certain path, which is determined by the crystalline structure. Therefore, in order to achieve high ionic conductivity, it is often required to sinter the molded article to connect the ion conductive path between the solid electrolyte particles. In contrast, the ionic conductivity of the amorphous solid electrolytes is isotropic, so that the ion conductive path between the particles can be easily connected by the pressure molding process. Consequently, in manufacturing an electrochemical device, it is preferable to use an amorphous solid electrolyte for the molded solid electrolyte which has the object of simplifying the process.

Moreover, lithium ion conductive amorphous solid electrolytes include those mainly composed of a sulfide such as $Li_2S$—$SiS_2$ and those mainly composed of an oxide such as $Li_2O$—$SiO_2$. Those mainly composed of a sulfide have high reactivity against moisture and the like and it is necessary to use a nonpolar solvent when they are combined with a polymer composition. The polymer composition of the present invention consisting of 50 to 100 wt % of 1,2-polybutadiene having a 1,2-vinyl bond content of 70% or more and a crystallinity of 5 to 50%, and 0 to 50 wt % of polar rubber is soluble to a nonpolar solvent, and can be combined with them without damaging the properties of the lithium ion conductive amorphous solid electrolyte mainly composed of a sulfide.

As the lithium ion conductive inorganic solid electrolyte, one having high ionic conductivity and a wide potential window is preferable, and an amorphous one mainly composed of a sulfide is particularly preferable because it has both of these properties. It is also possible to use an oxo sulfide obtained by substituting sulfur in the sulfide solid electrolyte by oxygen in parts so as to stabilize the amorphous structure, or to use one containing a halide ion such as iodide ion so as to further improve the ionic conductivity.

As the lithium ion conductive amorphous inorganic solid electrolyte mainly composed of a sulfide, when lithium sulfide and silicon sulfide are used as starting materials, the vapor pressure of the starting materials becomes low, thereby suppressing the evaporation of the starting materials in synthesizing the solid electrolyte. Since this can simplify the synthesis of the solid electrolyte, one containing silicon is used particularly preferably as the lithium ion conductive amorphous compound.

As the ratio of the above-mentioned polymer composition (solid content) to the solid electrolyte in the molded solid electrolyte of the present invention, the weight ratio of the polymer composition and the solid electrolyte may be 0.2:99.8 to 30:70. Preferably it is 0.4:99.6 to 5:95 from the viewpoint of obtaining a molded solid electrolyte superior in ionic conductivity in particular.

The molded solid electrolyte of the present invention can enhance the mechanical strength of the lithium ion conductive molded solid electrolyte by adding an electronically insulating structural member. As specific examples of the electronically insulating structural member, there are woven fabric, nonwoven fabric, a porous film and the like.

The molded solid electrolyte of the present invention may be in the form of a film, sheet, thick film, flake or the like. As for the production method, a polymer composition solution consisting of 50 to 100 wt % of 1,2-polybutadiene having a 1,2-vinyl bond content of 70% or more and a crystallinity of 5 to 50%, and 0 to 50 wt % of polar rubber is added to solid electrolyte powder, followed by mixing and dispersing with a paint conditioner or the like to obtain a slurry having solid electrolyte powder dispersed in the polymer composition solution. Then, the slurry is applied on a base material having a mold release characteristic to obtain a molded solid electrolyte it the form of a film.

The molded solid electrolyte of the present invention can contain other components than the polymer composition and the solid electrolyte. For example, by making the molded article contain a structural member, the mechanical strength can be increased. In such an Example, a sheet-like molded solid electrolyte can be obtained by applying or impregnating the slurry onto or with an electronically insulating structural member such as woven fabric. As another structural member, electronically insulating powder such as alumina powder can be added in order to improve the mechanical strength during the pressuring and adhering process in constituting an electrochemical device.

The polymer composition of the present invention consisting of 50 to 100 wt % of 1,2-polybutadiene having a 1,2-vinyl bond content of 70% or more and a crystallinity of 5 to 50%, and 0 to 50 wt % of polar rubber can make excellent bonding between particles without disturbing the ion transfer when it is combined with other particles, thereby giving a molded article with high workability.

Next, a second Example of the present invention will be described. The second Example of the present invention relates to a molded electrode characterized by mainly composed of a polymer composition consisting of 50 to 100 wt % of 1,2-polybutadiene having a 1,2-vinyl bond content of 70% or more and a crystallinity of 5 to 50%, and 0 to 50 wt % of polar rubber, and an electrode active material.

The polymer composition used here can be the same as the one used in the above first Example.

In an electrode used for an electrochemical device, ions are exchanged between the electrode active material and the electrolyte. Since it is necessary to provide the electrode with high processibility without disturbing the ion transfer as mentioned above, the use of the polymer composition of the present invention consisting of 50 to 100 wt % of 1,2-polybutadiene having a 1,2-vinyl bond content of 70% or more and a crystallinity of 5 to 50%, and 0 to 50 wt % of polar rubber can constitute a molded electrode which satisfies these requirements.

Further, when a solid electrolyte is used as the electrolyte, there is another problem that if a binder is added to increase the processibility, the electrode reaction rate is likely to decrease in particular as described above, and the effect of using the polymer composition consisting of 50 to 100 wt % of 1,2-polybutadiene having a 1,2-vinyl bond content of 70% or more and a crystallinity of 5 to 50%, and 0 to 50 wt % of polar rubber is particularly large. In that case, the molded electrode contains either an electrode active material only or an electrode active material and a solid electrolyte, and the solid electrode used is lithium ion conductive.

Furthermore, as the lithium ion conductive solid electrolyte, amorphous ones, which have no anisotropy in the ion conductive path, facilitate the connection of the ion conductive path between the electrode active material and the electrolyte. As the amorphous lithium ion conductive solid electrolyte, those mainly composed of a sulfide are most preferably used due to their high ionic conductivity and wide potential window.

As the electrode active material, those which allow movable ions in the solid electrolyte to act as a reaction ion species of an electrode reaction can be used, and when the solid electrolyte is lithium ion conductive, there are exemplified transition metal oxides such as $MnO_2$ and $V_2O_5$, lithium-containing transition metal oxides such as $LiCoO_2$, $LiNiO_2$ and $LiMn_2O_4$, transition metal sulfides and lithium-containing transition metal sulfides such as $TiS_2$, $MoS_2$ and $FeS_2$, graphite- and lithium-containing graphite intercalation compounds and lithium-containing alloys. Among them, from the viewpoint of making a battery with high energy density, it is preferable to use the lithium-containing transition metal oxide showing a noble potential as the electrode active material for the positive electrode, and to use the graphite intercalation compound as the electrode active material for the negative electrode.

The mixing ratio of the above-mentioned polymer composition (solid content) to the electrode active material in the molded electrode of the present invention may be 0.2:99.8 to 30:70 in a weight ratio, and furthermore, the weight ratio is preferably 0.4:99.6 to 5:95 in a weight ratio, which is in a range to show high processibility and electrode reaction activity.

As for the amount of the lithium ion conductive inorganic solid electrolyte to be added, it may be 20% or less to the electrode active material in a weight ratio.

The mechanical strength of the molded electrode can be further enhanced by adding a structural member to the molded electrode, and particularly the structural member can enhance the electronic conductivity inside the electrode, and therefore a structural member comprising an electron conductive material is preferably used in particular. As the examples for the structural members comprising electronically conductive materials to be used in this case, there are metallic meshes of stainless steel, titanium, copper and the like.

The shape and production method of the molded electrode of the present invention can be the same as the above-mentioned molded solid electrolyte.

The 1,2-polybutadiene having a 1,2-vinyl bond content of 70% or more and a crystallinity of 5 to 50% used in the present invention has a rubber-like block of amorphous 1,2-polybutadiene as well as a crystalline syndiotactic 1,2-polybutadiene block. Since the rubber-like block of the amorphous 1,2-polybutadiene has a large free volume, it can absorb the volume change of the electrode active material while the electrochemical device is in operation. In addition, the crystalline syndiotactic 1,2-polybudadiene block provides the electrochemical device constituting particles with strong bonding property and flexibility. Furthermore, since the polar group in the polar rubber used in the present invention provides high adhesion to the interface of the structural member comprising the electronically conductive material, it becomes possible to obtain an electrochemical device which operates in a stable manner by solving a problem resulting from a decrease in bonding property between the particles due to the volume change of the active material or a decrease in bonding of the interface between the active material particles and the electron conductive structural member.

Thus, the third Example of the present invention relates to an electrochemical device comprising a pair of electrodes and an electrolyte layer characterized in that at least one of said pair of electrodes and the electrolyte layer contains a polymer composition consisting of 50 to 100 wt % of 1,2-polybutadiene having a 1,2-vinyl bond content of 70% or more and a crystallinity of 5 to 50%, and 0 to 50 wt % of polar rubber.

The polymer composition used in this case can be the same as the one mentioned above, and the other components can be the same as conventional ones.

EXAMPLES

The examples of the present invention will be described in detail as follows.

Synthesis of the lithium ion conductive inorganic solid electrolyte and measurement of the ionic conductivity described below were all conducted under a dry argon atmosphere.

First, a preparation example of the 1,2-polybutadiene having a 1,2-vinyl bond content of 70% or more and a crystallinity of 5 to 50% will be described. Table 1 shows the configuration and properties of the 1,2-polybutadiene having a 1,2-vinyl bond content of 70% or more and a crystallinity of 5 to 50%. The crystallinity was measured by a density measurement method.

Production Example 1

Production of a 1,2-polybutadiene Copolymer (R-1)

After a pressure-resistant glass bottle with an internal volume of 100 ml was subjected to nitrogen substitution, a 2 ml methylene dioxide solution containing 0.01 mol/l of cobalt bromide (II) bisphenyl phosphinic complex was added. Then, 2 ml of a methylene dichloride solution containing 0.01 mol/l of a diethyl xanthogenic disulfide, 45 ml of methylene dichloride, 8.2 ml of a methylene dichloride solution containing 0.0437 mol/l of $H_2O$, 6 g of 1,3-butadiene and 3 ml of a methylene dichloride solution containing 0.2 mol/l of triisobutyl aluminum were added in that order, and a polymerization reaction was conducted for 1.0 hour at 30° C. After the completion of the reaction, the reaction product was added to a large amount of methanol containing an antioxidant to precipitate a polymer, thereby obtaining powdery polymer. After having well washed with methanol, the powdered polymer was dried for 16 hours at 40° C. under a reduced pressure, so as to obtain the 1,2-polybutadiene copolymer (R-1).

Production Examples 2–4

Production of 1,2-polybutadiene Copolymers (R-2) to (R-4)

1,2-polybutadiene copolymers (R-2) to (R-4) were obtained by changing the amount of monomer, the amount of catalyst, polymerization temperature, polymerization time and the like to obtain 1,2-polybutadiene having a 1,2-vinyl bond content of 70% or more and a crystallinity of 5 to 50% as shown in Table 1.

Production Example 5

Production of a polymer composition of a 1,2-polybutadiene Copolymer and Polar Rubber By using either the 1,2-polybutadiene copolymer (R-2) or (R-3), and using acrylonitrile butadiene rubber (manufactured by JSR, trade name: N250S, the amount of bond acrylonitrile: 20%) and ethylene acrylic rubber (manufactured by Du Pont-Showa Denko Co., Ltd. Trades name VAMACG) as polar rubber, the 1,2-polybutadiene and the polar rubber were dissolved in toluene in accordance with the formulae shown in Table 2 below so as to obtain a polymer composition having an elastomer concentration of 3 wt %.

TABLE 1

| Sample No. | R-1 | R-2 | R-3 | R-4 |
| --- | --- | --- | --- | --- |
| 1,2-vinyl bond content (%) | 90 | 92 | 93 | 96 |
| Crystallinity (%) | 17 | 25 | 29 | 35 |
| syn-PBD (%) | 51 | 66 | 70 | 77 |
| Melting point (° C.) | 75 | 80 | 90 | 110 |
| Tg (low temperature) (° C.) | −30 | −25 | −23 | −20 |
| MFI (150° C., 2.16 kg) | 3 | 3 | 3 | 3 |
| Molecular weight (×10$^4$) | 18 | 19 | 19 | 20 | syn-PBD: syndiotactic 1,2-polybutadiene
MFI: melt flow index

TABLE 2

| | 1,2-polybutadiene | | Polar group-containing rubber | | | |
| --- | --- | --- | --- | --- | --- | --- |
| Ex. | Type | Content | Type | Content | Type | Content |
| 42 | R-3 | 100 | — | 0 | | |
| 42 | R-3 | 90 | N250S | 10 | | |
| 42 | R-3 | 80 | N250S | 20 | | |
| 42 | R-3 | 70 | N250S | 30 | | |

TABLE 2-continued

|     | 1,2-polybutadiene | | Polar group-containing rubber | | | |
| --- | --- | --- | --- | --- | --- | --- |
| Ex. | Type | Content | Type | Content | Type | Content |
| 43 | R-2 | 100 | — | 0 | | |
| 43 | R-2 | 90 | VAMAC G | 10 | | |
| 43 | R-2 | 80 | VAMAC G | 20 | | |
| 43 | R-2 | 70 | VAMAC G | 30 | | |
| 44 | R-3 | 100 | — | | | |
| 44 | R-3 | 80 | N250S | 0 | | 0 |
| 44 | R-3 | 80 | N250S | 20 | VAMAC G | 0 |
| 44 | R-3 | 80 | N250S | 15 | VAMAC G | 5 |
| 44 | R-3 | 80 | N250S | 10 | VAMAC G | 10 |
| 44 | R-3 | 80 | N250S | 5 | VAMAC G | 15 |
| 44 | R-3 | 80 | N250S | 0 | VAMAC G | 20 |

Example 1

A lithium ion conductive molded solid electrolyte was obtained by using lithium ion conductive sulfide glass represented by $0.6Li_2S\text{-}0.4SiS_2$ as the solid electrolyte and also using the 1,2-polybutadiene copolymer (R-1). The details will be described as follows.

First, as the solid electrolyte, a lithium ion conductive amorphous solid electrolyte represented by $0.6Li_2S\text{-}0.4SiS_2$ was synthesized by the following method.

Lithium sulfide ($Li_2S$) and silicon sulfide ($SiS_2$) were mixed in a mole ratio of 0.6:0.4, and the mixture was put in a crucible of glass-like carbon. The crucible was put in a vertical type furnace and heated up to 950° C. in a current of argon to make the mixture in the molten state. After heating for two hours, the crucible was dropped in a liquid nitrogen to be quenched to obtain the lithium ion conductive amorphous solid electrolyte represented by $0.6Li_2S\text{-}0.4SiS_2$.

From the lithium ion conductive amorphous solid electrolyte thus obtained and the 1,2-polybutadiene copolymer (R-1), the lithium ion conductive molded solid electrolyte was obtained by the following method.

First, the solid electrolyte obtained above was pulverized to be 350 mesh or finer. A toluene solution of (R-1) was added to this solid electrolyte powder, and well kneaded to obtain a slurry. The mixing ratio at the kneading was chose such that the weight ratio of the solid content of the copolymer (R-1) to the solid electrolyte powder was 2:98. The slurry thus obtained was applied on a fluorine resin plate by a doctor blade method, and dried by evaporating toluene under a reduced pressure at 100° C. After drying for three hours, by removing from the fluorine resin plate, the lithium ion conductive molded solid electrolyte was obtained.

The ionic conductivity of the lithium ion conductive molded solid electrolyte was measured by an AC impedance method described below.

First, a sheet of the lithium ion conductive molded solid electrolyte obtained above was cut into a disk of 10 mmϕ. A platinum plate of 10 mmϕ was pressed and adhered against both sides of the disk to make an electrode for impedance measurement, and to form an ionic conductivity measuring battery.

The AC impedance was measured by applying a 10 mV AC voltage by a vector impedance analyzer. As a result, the obtained ionic conductivity of the lithium ion conductive molded solid electrolyte was $2.6 \times 10^{-4}$ S/cm.

In addition, as a comparative example, solid electrolyte powder was pressure molded without adding the 1,2-polybutadiene copolymer, and the ionic conductivity was measured in the same manner to find that the ionic conductivity was $4.5 \times 10^{-4}$ S/cm.

Then, in order to examine the flexibility as the evaluation of workability of the lithium ion conductive molded solid electrolyte, a bending test was conducted. In the bending test, the lithium ion conductive molded solid electrolyte was wound around a 50 mmϕ stainless steel rod, and the condition of the molded article was visually observed. As a result, the lithium ion conductive molded solid electrolyte of the present example did not show any discernible fault, which indicated high flexibility.

Example 2

A lithium ion conductive molded solid electrolyte was obtained in the same manner as in Example 1 except that the (R-2) was used in place of the (R-1) used in Example 1 as the 1,2-polybutadiene copolymer.

The ionic conductivity of the lithium ion conductive molded solid electrolyte was measured in the same manner as in Example 1 to find that the ionic conductivity was $2.9 \times 10^{-4}$ S/cm.

In addition, the bending test conducted in the same manner as in Example 1 revealed no discernible fault, which indicated high flexibility.

Example 3

A lithium ion conductive molded solid electrolyte was obtained in the same manner as in Example 1 except that the (R-3) was used in place of the (R-1) used in Example 1 as the 1,2-polybutadiene copolymer.

The ionic conductivity of the lithium ion conductive molded solid electrolyte was measured in the same manner as in Example 1 to find that the ionic conductivity was $3.6 \times 10^{-4}$ S/cm.

In addition, the bending test conducted in the same manner as in Example 1 revealed no discernible fault, which indicated high flexibility.

Example 4

A lithium ion conductive molded solid electrolyte was obtained in the same manner as in Example 1 except that the (R-4) was used In place of the (R-1) used in Example 1 as the 1,2-polybutadiene copolymer.

The ionic conductivity of the lithium Ion conductive molded solid electrolyte was measured in the same manner as in Example 1 to find that the ionic conductivity was $2.6 \times 10^{-4}$ S/cm.

In addition, the bending test conducted in the same manner as in Example 1 revealed no discernible fault, which indicated high flexibility.

Example 5

A lithium ion conductive molded solid electrolyte was composed by using a lithium ion conductive amorphous solid electrolyte represented by $0.01Li_3PO_4\text{-}0.63Li_2S\text{-}0.36SiS_2$ as the lithium ion conductive inorganic solid electrolyte, and using the (R-3) in the same manner as in Example 3 as the 1,2-polybutadiene copolymer, respectively. The details will be described as follows.

First, as the lithium ion conductive inorganic solid electrolyte, the lithium ion conductive amorphous solid electrolyte represented by $0.01Li_3PO_4\text{-}0.63Li_2S\text{-}0.36SiS_2$ was synthesized by the following method.

First, a glass matrix for synthesizing the amorphous solid electrolyte was synthesized. Lithium sulfide ($Li_2S$) and silicon sulfide ($SiS_2$) were mixed in a mole ratio of 0.64:0.36, and the mixture was put in glass-like carbon crucible to melt in a horizontal type furnace at 950° C. After this, the molten solution was quenched with a twin roller to obtain an amorphous solid electrolyte represented by $0.64Li_2S$-$0.36SiS_2$. Using this amorphous solid electrolyte as the glass matrix, lithium phosphate was added so as to make the composition of $0.01Li_3PO_4$-$0.63Li_2S$-$0.36SiS_2$ after pulverization. The mixture was heated and quenched in the same manner as above to obtain the lithium ion conductive amorphous solid electrolyte represented by $0.01Li_3PO_4$-$0.63Li_2S$-$0.36SiS_2$.

A lithium ion conductive molded solid electrolyte was obtained in the same manner as in Example 1 except that this solid electrolyte was used instead of the solid electrolyte represented by $0.6Li_2S$-$0.4SiS_2$, and that the (R-3) used in Example 3 was used as the 1,2-polybutadiene copolymer.

The ionic conductivity of the lithium ion conductive molded solid electrolyte was measured in the same manner as in Example 1 to find that it was $5.6 \times 10^{-4}$ S/cm. In addition, as a comparative example, the ionic conductivity of the solid electrolyte powder used singly was measured in the same manner as in Example 1 to find that it was $7.8 \times 10^{-4}$ S/cm.

Moreover, the bending test conducted in the same manner as in Example 1 revealed no discernible fault, which indicated high flexibility.

Example 6

A lithium ion conductive molded solid electrolyte was composed by using a lithium ion conductive amorphous solid electrolyte represented by $0.05Li_2O$-$0.60Li_2S$-$0.35SiS_2$ as the lithium ion conductive inorganic solid electrolyte, and using the (R-3) in the same manner as in Example 3 as the 1,2-polybutadiene copolymer, respectively. The details will be described as follows.

The lithium ion conductive amorphous solid electrolyte represented by $0.05Li_2O$-$0.60Li_2S$-$0.35SiS_2$ was synthesized in the same manner as in Example 5 except that lithium oxide was used instead of lithium phosphate.

A lithium ion conductive molded solid electrolyte was obtained in the same manner as in Example 1 except that the lithium ion conductive solid electrolyte thus obtained was used, and that the (R-3) used in Example 3 was used as the 1,2-polybutadiene copolymer.

The ionic conductivity of the lithium ion conductive molded solid electrolyte was measured in the same manner as in Example 1 to find that it was $4.5 \times 10^{-4}$ S/cm. In addition, as a comparative example, the ionic conductivity of the solid electrolyte powder used singly was measured in the same manner as in Example 1 to find that it was $6.6 \times 10^{-4}$ S/cm.

Moreover, the bending test conducted in the same manner as in Example 1 revealed no discernible fault, which indicated high flexibility.

Example 7

A lithium ion conductive molded solid electrolyte was composed by using a lithium ion conductive amorphous solid electrolyte represented by $0.30LiI$-$0.35Li_2S$-$0.35SiS_2$ as the lithium ion conductive inorganic solid electrolyte, and using the (R-1) as the same as in Example 1 as the 1,2-polybutadiene copolymer, respectively. The details will be described as follows.

First of all, as the lithium ion conductive inorganic solid electrolyte, the lithium ion conductive amorphous solid electrolyte represented by $0.30LiI$-$0.35Li_2S$-$0.35SiS_2$ was synthesized by the following method.

First, an amorphous solid electrolyte represented by $0.5Li_2S$-$0.5SiS_2$ was obtained in the same manner as in Example 1 except that the mixing ratio of the starting materials was changed. By using this amorphous solid electrolyte as a glass matrix, lithium iodide was added so as to make the composition of $0.30LiI$-$0.35Li_2S$-$0.35SiS_2$ after pulverization. This mixture was heated and quenched again in the same manner to obtain the lithium ion conductive amorphous solid electrolyte represented by $0.30LiI$-$0.35Li_2S$-$0.35SiS_2$.

A lithium ion conductive molded solid electrolyte was obtained in the same manner as in Example 1 except that this solid electrolyte was used instead of the solid electrolyte represented by $0.6Li2S$-$0.4SiS_2$.

The ionic conductivity of the lithium ion conductive molded solid electrolyte was measured in the same manner as in Example 1 to find that it was $3.7 \times 10^{-4}$ S/cm. In addition, as a comparative example, the ionic conductivity of the solid electrolyte powder used singly was measured in the same manner as in Example 1 to find that it was $7.2 \times 10^{-4}$ S/cm.

Moreover, the bending test conducted in the same manner as in Example 1 revealed no discernible fault, which indicated high flexibility.

Example 8

A lithium ion conductive molded solid electrolyte was composed by using a lithium ion conductive amorphous solid electrolyte represented by $0.5Li_2S$-$0.5P_2S_5$ as the lithium ion conductive inorganic solid electrolyte, and using the (R-1) as the same as in Example 1 as the 1,2-polybutadiene copolymer, respectively. The details will be described as follows.

First, as the raw materials of the solid electrolyte, lithium sulfide ($Li_2S$) and phosphorus sulfide ($P_2S_5$) were mixed in a mole ratio of 0.5:0.5. After the mixture was sealed in a quartz tube to melt at 900° C., the quartz tube was dropped into water to quench to obtain the amorphous solid electrolyte represented by $0.5Li_2S$-$0.5P_2S_5$.

The lithium ion conductive molded solid electrolyte was obtained in the same manner as in Example 1 except that this solid electrolyte was used instead of the solid electrolyte represented by $0.6Li_2S$-$0.4SiS_2$.

The ionic conductivity of each of this lithium ion conductive molded solid electrolyte and the solid electrolyte powder as a comparative example was measured in the same manner as in Example 1 to find that the ionic conductivity of the molded solid electrolyte to which the 1,2-polybutadiene copolymer was added was $1.0 \times 10^{-4}$ S/cm, indicating that the decrease from $1.6 \times 10^{-4}$ S/cm of the solid electrolyte used only was within 1/2.

Moreover, the bending test conducted in the same manner as in Example 1 revealed no discernible fault, which indicated high flexibility.

Example 9

A lithium ion conductive molded solid electrolyte was composed by using a lithium ion conductive amorphous solid electrolyte represented by $0.6Li_2S$-$0.4B_2S_3$ as the lithium ion conductive inorganic solid electrolyte, and using the (R-1) as the same as in Example 1 as the 1,2- polybutadiene copolymer, respectively. The details will be described as follows.

First, the amorphous solid electrolyte represented by $0.6Li_2S-0.4B_2S_3$ was obtained in the same manner as in Example 8 except that a mixture of lithium sulfide ($Li_2S$) and boron sulfide ($B_2S_3$) in a mole ratio of 0.6:0.4 was used as the raw materials of the solid electrolyte.

The lithium ion conductive molded solid electrolyte was obtained in the same manner as in Example 1 except that this solid electrolyte was used instead of the solid electrolyte represented by $0.6Li_2S-0.4SiS_2$.

The ionic conductivity of each of the lithium ion conductive molded solid electrolyte and the solid electrolyte powder as a comparative example was measured in the same manner as in Example 1 to find that the ionic conductivity of the molded solid electrolyte to which the 1,2-polybutadiene copolymer was added was $1.3 \times 10^{-4}$ S/cm, indicating that the decrease from $1.9 \times 10^{-4}$ S/cm of the solid electrolyte used only was within ½.

Moreover, the bending test conducted in the same manner as in Example 1 revealed no discernible fault, which indicated high flexibility.

As described hereinbefore, from Examples 1 through 9, it has been found that the present invention can provide a lithium ion conductive molded solid electrolyte which has high lithium ion conductivity and excels in worlkability.

Example 10

By using the amorphous solid electrolyte represented by $0.6Li_2S-0.4SiS_2$ as the lithium ion inorganic solid electrolyte in the same manner as in Example 1 and using the (R-3) as the 1,2-polybutadiene copolymer, various lithium ion conductive molded solid electrolytes which have various composition ratios of the lithium ion inorganic solid electrolyte to the 1,2-polybutadiene copolymer were obtained. The details will be shown as follows.

From the (R-3) and the lithium ion conductive inorganic solid electrolyte obtained in Example 1, a lithium ion conductive molded solid electrolyte having a composition ratio changed in the same method as in Example 1 was obtained.

Table 3 shows the relation between the composition ratio of the lithium ion conductive molded solid electrolyte and the ionic conductivity when the composition ratio is changed. Table 3 also shows the results of the bending test.

TABLE 3

| Ratio of 1,2-polybutadiene copolymer(R-3)(wt %) | 0.4 | 1.0 | 2.0 | 3.5 | 5.0 |
|---|---|---|---|---|---|
| Ratio of lithium ion conductive solid electrolyte (wt %) | 99.6 | 99.0 | 98.0 | 96.5 | 95.0 |
| Ionic conductivity ($\times 10^{-4}$ S/cm) | 4.1 | 3.8 | 3.4 | 2.8 | 2.0 |
| Bending test | Excellent | Excellent | Excellent | Excellent | Excellent |

Notes
Example 3

The results show that the use of a 1,2-polybutadiene copolymer makes it possible to obtain a lithium ion conductive molded solid electrolyte which is superior in flexibility even with a small amount of addition, and has high ionic conductivity as well. Furthermore, the 1,2-polybutadiene copolymer has a feature of causing a minor decrease in ionic conductivity even if a relatively large amount is added.

Example 11

A lithium ion conductive molded solid electrolyte was obtained by using the amorphous solid electrolyte represented by $0.01Li_3PO_4-0.63Li_2S-0.36SiS_2$ obtained in Example 5 as the lithium ion inorganic solid electrolyte, and using the (R-3) as the 1,2-polybutadiene copolymer, and further using polyethylene mesh as the electronically insulating structural member. The composition ratio of the solid content of (R-3) to the solid electrolyte was in a weight ratio of 2:98. The details will be described as follows.

The slurry containing the solid electrolyte and the 1,2-polybutadiene copolymer was obtained in the same manner as in Example 1. Then, the slurry was filled into the openings of the polyethylene mesh having an open air ratio of 70% by the doctor blade method. After this, it was dried by evaporating toluene under a reduced pressure at 40° C. to obtain a lithium ion conductive molded solid electrolyte.

The ionic conductivity of the lithium ion conductive molded solid electrolyte was measured in the same manner as in Example 1 to find that the ionic conductivity was $3.1 \times 10^{-4}$ S/cm.

Moreover, the bending test conducted in the same manner as in Example 1 revealed no discernible fault, and the bending test with the 5 mmφ stainless steel rod revealed no discernible fault, either, which indicated that the lithium ion conductor of the present example had higher flexibility.

Example 12

A lithium ion conductive molded solid electrolyte was obtained in the same manner as Example 11 except that the lithium ion conductive amorphous solid electrolyte represented by $0.6Li_2S-0.4SiS_2$ obtained in Example 1 was used instead of the $0.01Li3PO_4-0.63Li_2S-0.36SiS_2$ used in Example 11 as the lithium ion conductive inorganic solid electrolyte, that the (R-1) was used instead of the (R-3) used in Example 11 as the 1,2-polybutadiene copolymer and that a glass fiber mesh was used instead of the polyethylene mesh used in Example 11 as the electronically insulating structural member. The composition ratio of the solid content of (R-1) to the solid electrolyte was in a weight ratio of 2:98.

The ionic conductivity of the resultant lithium ion conductive molded solid electrolyte was measured in the same manner as in Example 1 to find that the ionic conductivity was $2.4 \times 10^{-4}$ S/cm.

Moreover, the bending test conducted in the same manner as in Example 1 revealed no discernible fault, and the bending test with the 5 mmφ stainless steel rod revealed no discernible fault, either, which indicated that the lithium ion conductive molded solid electrolyte of the present example had higher flexibility.

As described hereinbefore, from Examples 11 and 12, it has been found that the present invention which uses a lithium ion conductive inorganic solid electrolyte, 1,2-polybutadiene copolymer and electronically insulating structural member can provide a lithium ion conductive molded solid electrolyte having particularly high workability and high lithium ion conductivity.

Comparative Example 1

As a comparative example, by using a styrene-ethylene-butylene-styrene block copolymer (manufactured by SHELL, trade name: KRATON G1652) having no crystalline block structure and using the amorphous solid electrolyte represented by 0.6Li2S-0.4SiS$_2$ in the same manner as in Example 1 as the lithium ion inorganic solid electrolyte, various lithium ion conductive molded solid electrolytes which differed in the composition ratio of the lithium ion inorganic solid electrolyte to SEBS were obtained. The composition ratio of the copolymer to the solid electrolyte was in a weight ratio of 2:98. The details will be described as follows.

From the SEBS and the lithium ion conductive inorganic solid electrolyte obtained in Example 1, lithium ion conductive molded solid electrolytes having composition ratios changed in the same manner as in Example 1 were obtained.

Table 4 shows the relation between the composition ratio of the lithium ion conductive molded solid electrolyte and the ionic conductivity when the composition ratio was changed. Table 4 also shows the results of the bending test.

TABLE 4

| Ratio of SEBS copolymer (wt %) | 0.4 | 1.0 | 2.0 | 3.5 | 5.0 |
|---|---|---|---|---|---|
| Ratio of a lithium ion conductive solid electrolyte (wt %) | 99.6 | 99.0 | 98.0 | 96.5 | 95.0 |
| Ionic conductivity (×10$^{-4}$ S/cm) | — | — | — | 0.9 | 0.5 |
| Bending test | Not collectable as a molded article | Not collectable as a molded article | Not collectable as a molded article | Occurrence of cracks | Excellent |

Notes
Conductivity measurement is impossible because of collecting failure as a molded article Comparative Example 2

As a comparative example, by using a copolymer (hereinafter referred to as H-SBR) made by polymerizing 5 wt % of styrene and 95 wt % of butadiene and hydrogenating the styrene-butadiene-random copolymer in which the butadiene contained 80% of 1,2-binyl bond, and using the amorphous solid electrolyte represented by 0.6Li$_2$S-0.4SiS$_2$ in the same manner as in Example 1 as the lithium ion inorganic solid electrolyte, various lithium ion conductive molded solid electrolytes which differed in the composition ratio of the lithium ion inorganic solid electrolyte to the H-SBR were obtained. The details will be described as follows.

From the H-SBR and the lithium ion conductive inorganic molded solid electrolyte obtained in Example 1, lithium ion conductive molded solid electrolytes having composition ratios changed in the same manner as in Example 1 were obtained.

Table 5 shows the relation between the composition ratio of the lithium ion conductive molded solid electrolyte and the ionic conductivity when the composition ratio was changed. Table 5 also shows the results of the bending test.

TABLE 5

| Ratio of H-SBR (wt %) | 0.4 | 1.0 | 2.0 | 3.5 | 5.0 |
|---|---|---|---|---|---|
| Ratio of a lithium ion conductive solid electrolyte (wt %) | 99.6 | 99.0 | 98.0 | 96.5 | 95.0 |
| Ionic conductivity (×10$^{-4}$ S/cm) | — | — | — | — | 0.4 |
| Bending test | Not collectable as a molded article | Not collectable as a molded article | Not collectable as a molded article | Not collectable as a molded article | Excellent |

Notes
Conductivity measurement is impossible because of collecting failure as a molded article A comparison of the examples to the comparative examples described hereinbefore shows that the 1,2-polybutadiene with a crystalline block of the present invention having a 1,2-vinyl bond content of 70% or more and a crystallinity of 5 to 50% is superior in workability and flexibility, and is a material suitable to obtain a lithium ion conductive molded solid electrolyte having high ionic conductivity.

Example 13

In the present example, an example of producing a proton conductive molded solid electrolyte by using a silica gel doped with phosphorus acid as the proton conductive solid electrolyte, and using the (R-1) as the 1,2-polybutadiene having a 1,2-vinyl bond content of 70% or more and a crystallinity of 5 to 50% will be described.

First, the silica gel doped with phosphorus acid was synthesized by the following method.

As the starting material to synthesize the silica gel, tetraethoxysilane (TEOS) was used and diluted in ethanol. At this time, the mixing ratio of the TEOS to the ethanol was made to be 1:4 in a mole ratio. Furthermore, into this solution, pure water was added by a mole ratio of 8 to the TEOS, and a 3.6 wt % hydrochloric acid solution was added so that HCl had a mole ratio of 0.01 to the TEOS, and tetraethyl ammonium tetrafluoroborate was added to have a mole ratio of 0.01 in the same manner, and stirred for five minutes. Then, a 85 wt % aqueous phosphorus acid solution was added to make TEOS:$H_3PO_4$=1:0.5, and stirred for three hours in a sealed container. Finally, it was gelled for five hours and heated for two hours at 150° C. to obtain the silica gel doped with phosphorus acid.

The silica gel doped with phosphorus acid thus obtained was pulverized and stirred in a toluene solution of the (R-1). It should be noted that the ratio of the proton conductive solid electrolyte to the solid content of the (R-1) copolymer was made 19:1 in a weight ratio. The slurry thus obtained was applied on a fluorine resin plate by the doctor blade method and dried by evaporating toluene under a reduced pressure of 100° C. After drying for three hours, by removing from the fluorine resin plate, the proton conductive molded solid electrolyte was obtained.

The ionic conductivity of the proton conductive molded solid electrolyte thus obtained was measured in the same AC impedance method as in Example 1 to find that the ionic conductivity was $3.3 \times 10^{-3}$ S/cm.

Moreover, the bending test conducted in the same manner as in Example 1 revealed no discernible fault, which indicated that the proton conductive molded solid electrolyte of the present example had higher flexibility.

As described hereinbefore, it has been found that the present invention using the proton conductive inorganic solid electrolyte and 1,2-polybutadiene having a 1,2-vinyl bond content of 70t or more and a crystallinity of 5 to 50% can provide a proton conductive molded solid electrolyte which has high workability and high proton conductivity.

Example 14

In the present example, an example of producing a silver ion conductive molded solid electrolyte by using a solid electrolyte represented by $Ag_6I_4WO_4$ as the silver ion conductive solid electrolyte, and using the (R-1) as the 1,2-polybutadiene will be described.

First, the $Ag_6I_4WO_4$ was synthesized as follows.

As starting materials, silver iodide (AgI), silver oxide ($Ag_2O$) and tungstic oxide ($WO_3$) were used. These starting materials were mixed and heated in a quartz crucible at 400° C. to melt. Then, they were cooled in a furnace to obtain the silver ion conductive solid electrolyte represented by $Ag_6I_4WO_4$.

The silver ion conductive solid electrolyte thus obtained was pulverized and stirred in a toluene solution of the (R-1). It should be noted that the ratio of the silver ion conductive solid electrolyte to the solid content of the (R-1) copolymer was made 97:3 in a weight ratio. The slurry thus obtained was applied on a fluorine resin plate by the doctor blade method and dried by evaporating toluene under a reduced pressure of 100° C. After drying for three hours, by removing from the fluorine resin plate, the silver ion conductive molded solid electrolyte was obtained.

The ionic conductivities of the silver ion conductive molded solid electrolyte thus obtained and of a silver ion conductive solid electrolyte containing no 1,2-polybutadiene copolymer for comparison were measured by the same AC impedance method as in Example 1. As a result, the ionic conductivity was $4.0 \times 10^{-2}$ S/cm in the case of the silver ion conductive solid electrolyte used only, while it was $2.4 \times 10^{-2}$ S/cm when the 1,2-polybutadiene copolymer was added, indicating that a decrease in ionic conductivity was within ½.

Moreover, the bending test conducted in the same manner as in Example 1 revealed no discernible fault, which indicated that the silver ion conductive molded solid electrolyte of the present example had higher flexibility.

As described hereinbefore, it has been found that the present invention using the silver ion conductive inorganic solid electrolyte and the 1,2-polybutadiene can provide a silver ion conductive molded solid electrolyte which has high workability and high silver ion conductivity.

Example 15

A molded electrode was obtained by using a lithium cobalt oxide represented by $LiCoO_2$ which was an electron-lithium ion mixed conductor as the electrode active material and using the (R-1) as the 1,2-polybutadiene copolymer. The details will be described as follows.

First, the $LiCoO_2$ was synthesized by weighing cobalt oxide ($Co_3O_4$) and lithium carbonate ($LI_2CO_3$) to have a ratio that Co/Li=1, mixing and baking them in the air at 900° C.

From the $LiCoO_2$ thus obtained and the (R-1), the molded electrode was obtained by the following method.

First, the $LiCoO_2$ obtained as above was pulverized to be 350 mesh or finer. A toluene solution of the H-1 was added to the $LiCoO_2$ powder and kneaded well to make a slurry. The mixing ratio at the kneading was controlled such that the solid content of the 1,2-polybutadiene copolymer to the $LiCoO_2$ powder was in a weight ratio of 5:95. The slurry thus obtained was applied on a fluorine resin plate by the doctor blade method and dried by evaporating toluene under a reduced pressure of 100° C. After drying for three hours, by removing from the fluorine resin plate and cutting, a molded electrode having a diameter of 10 mm$\phi$ and a thickness of 0.2 mm was obtained.

For comparison, a dispersion solution of polytetrafluoroethylene was used instead of the 1,2-polybutadiene copolymer used in the present example to obtain a molded electrode in the same manner.

Furthermore, for comparison, without adding a binder such as the 1,2-polybutadiene copolymer, the $LiCoO_2$ was pressure molded to form a disk having a diameter of 10 mm$\phi$ and a thickness of 0.2 mm so as to obtain a molded electrode.

The electrochemical properties of the molded electrode thus obtained were evaluated by the following AC impedance method.

FIG. 1 shows the conceptual diagram of a measuring device. In the drawing, numeral 1 represents a sample holder, and a molded electrode 2 was pressed against a lead terminal 3 to form a test electrode. The test electrode was immersed in an electrolyte 4 containing a mixture solvent of propylene carbonate and dimethoxyethane in a ratio of 1:1 and lithium phosphorus hexafluoride ($LiPF_6$) dissolved in the mixture solvent so as to have a concentration of 1.0 M. As a reference electrode 5 and a counter electrode 6, a metal lithium foil was used, and each electrode was immersed in the electrolyte, too, to form a measuring battery. The measuring battery was applied with a 10 mV AC voltage by an impedance analyzer to measure the AC impedance in a frequency range of 100 kHz to 1 mHz.

Figure 2:
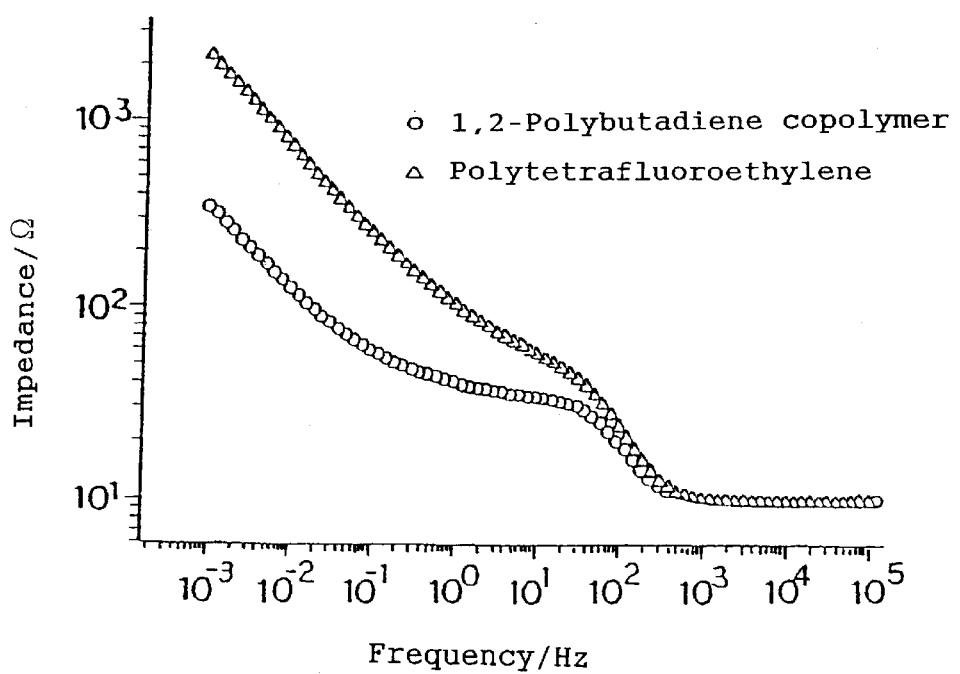
FIG. 2 is the AC impedance spectra of the molded electrodes of one example of the present invention and of one comparative example.

As a result, when the molded electrode obtained without the addition of a binder was used, the $LiCoO_2$ which was an electrode active material dropped off into the electrolyte during the measurement due to the poor processability of the electrode, making it impossible to measure the impedance. The impedance spectrums obtained when the 1,2-polybutadiene copolymer of the present invention and the polytetrafluoroethylene of the comparative example were respectively used as binders are shown in FIG. 2. As apparent from this drawing, when a designated polymer of the present invention was used as a binder, the impedance showed a low value, which indicated that a molded electrode showing a high electrode reactivity was obtained.

Example 16

A molded electrode was obtained in the same manner as in Example 15 except that the (R-2) was used instead of the (R-1) used in Example 15 as the 1,2-polybutadiene copolymer.

An AC impedance measurement was conducted as the electrode properties of this molded electrode in the same manner as in Example 15 to find that the value of the impedance at 10 mHz was 300 Ω, indicating that the impedance was lower than in the case where the polytetrafluoroethylene was used as the binder obtained in Example 15.

Example 17

A molded electrode was obtained in the same manner as in Example 15 except that the (R-3) was used instead of the (R-1) used in Example 15 as the 1,2-polybutadiene copolymer.

An AC impedance measurement was conducted as the electrode properties of this molded electrode in the same manner as in Example 15 to find that the value of the impedance at 10 mHz was 260 Ω, indicating that the impedance was lower than in the case where the polytetrafluoroethylene was used as the binder obtained in Example 15.

Example 18

A molded electrode was obtained in the same manner as in Example 15 except that the (R-4) was used instead of the (R-1) used in Example 15 as the 1,2-polybutadiene copolymer.

An AC impedance measurement was conducted as the electrode properties of this molded electrode in the same manner as in Example 15 to find that the value of the impedance at 10 mHz was 400 Ω, indicating that the impedance was lower than in the case where the polytetrafluoroethylene was used as the binder obtained in Example 15.

Example 19

A molded electrode was obtained by using as an electron-lithium ion mixed conductor $LiNiO_2$ instead of the lithium cobalt oxide represented by $LiCoO_2$ used in Example 15 and using the (R-2) as the 1,2-polybutadiene copolymer in the same manner as in Example 16. The details will be described as follows.

First, the $LiNiO_2$ was synthesized by mixing nickel oxide (NiO) and lithium hydroxide and heating the mixture in the air at 800° C.

Then, the $LiNiO_2$ obtained above was pulverized to be 350 mesh or finer. By using the $LiNiO_2$ powder and a toluene solution of the R-2, a molded electrode was obtained in the same manner as in Example 15.

For comparison, a molded electrode was obtained in the same manner by using a toluene solution of the styrene-ethylene-butadiene-styrene block copolymer used in Comparative Example 1 instead of the 1,2-polybutadiene copolymer used in the present Example.

Furthermore, for comparison, a molded electrode was obtained by pressure molding the $LiNiO_2$ into a disk having a diameter of 10 mmφ and a thickness of 0.2 mm without adding a binder such as the 1,2-polybutadiene copolymer.

The electrochemical properties of the molded electrode thus obtained were evaluated by the same AC impedance method as in Example 15.

As a result, when the molded electrode obtained without adding a binder was used, the $LiNiO_2$ which was an electrode active material dropped off into the electrolyte during the measurement due to the poor processability of the electrode, making it impossible to measure the impedance. In addition, as a result of the AC impedance measurement conducted when the 1,2-polybutadiene copolymer of the present invention and the styrene-ethylene-butadiene-styrene copolymer of the comparative example were used as binders, the impedance was 430 Ω at 10 mHz in the case of the molded electrode which used the 1,2-polybutadiene copolymer of the present invention as a binder, while the impedance was 740 Ω in the case of the molded electrode which used the styrene-ethylene-butadiene-styrene copolymer of the comparative example, which indicated that the molded electrode of the present invention showed a lower impedance, and that a molded electrode showing a high electrode reactivity was obtained.

Example 20

A molded electrode was obtained by using a lithium manganese oxide represented by $LiMn_2O_4$ as the material showing an electrochemical oxidation-reduction reaction in an electrolyte having lithium ion conductivity, and using the (R-2) as the 1,2-polybutadiene copolymer in the same manner as in Example 16. The details will be described as follows.

The $LiMn_2O_4$ was synthesized by mixing lithium carbonate ($Li_2CO_3$) and manganese acetate ($Mn(CH_3COO)_2$) and heating the mixture in the air at 750° C.

Then, the $LiMn_2O_4$ obtained above was pulverized to be 350 mesh or finer. This $LiMn_2O_4$ powder and graphite powder as the electron conductive substance were mixed in a weight ratio of 9:1. Furthermore, a molded electrode was obtained in the same manner as in Example 15 by using a toluene solution of the (R-2). It should be noted that the mixing ratio at the kneading was controlled such that the solid content of the 1,2-polybutadiene copolymer and the $LiMn_2O_4$ powder were in a weight ratio of 5:95.

For comparison, a molded electrode was obtained in the same manner by using a dispersion solution of the polytetrafluoroethylene instead of the 1,2-polybutadiene copolymer used in the present example.

Furthermore, for comparison, a molded electrode was obtained by pressure molding a mixture of the $LiMn_2O_4$ powder and the graphite into a disk having a diameter of 10 mm$\phi$ and a thickness of 0.2 mm, without adding a binder such as the 1,2-polybutadiene copolymer.

The electrochemical properties of the molded electrodes thus obtained were evaluated by the same AC impedance method as in Example 15.

As a result, when the molded electrode obtained without adding a binder was used, the $LiMn_2O_4$ which was an electrode active material dropped off into the electrolyte during the measurement due to the poor processibility of the electrode, making it impossible to measure the impedance. In addition, as a result of the AC impedance measurement conducted when the 1,2-polybutadiene copolymer of the present invention and the polytetrafluoroethylene of the comparative example were used as binders, the impedance was 540 Ω at 10 mHz in the case of the molded electrode which used the 1,2-polybutadiene copolymer of the present invention as a binder, while the impedance was 810 Ω in the case of the molded electrode which used the polytetrafluoroethylene of the comparative example, which indicated that the molded electrode of the present invention showed a lower impedance, and that a molded electrode showing a high electrode reactivity was obtained.

Example 21

A molded electrode was constituted by using fluorinated graphite as the electrode active material and using the (R-2) as the 1,2-polybutadiene copolymer in the same manner as in Example 16. The details will be described as follows.

The fluorinated graphite was synthesized by heating a graphite powder in a fluorine gas at 600° C.

A molded electrode of the present invention and a molded electrode for comparison were produced in the same manner as in Example 20 except that the fluorinated graphite thus obtained was used instead of $LiMn_2O_4$, and their electrochemical properties were examined.

As a result, when the molded electrode obtained without adding a binder was used, the fluorinated graphite which was an electrode active material dropped off into the electrolyte during the measurement due to the poor processibility of the electrode, making it impossible to measure the impedance. In addition, as a result of the AC impedance measurement conducted when the 1,2-polybutadiene copolymer of the present invention and the polytetrafluoroethylene of the comparative example were used as binders, the impedance was 730 Ω at 10 mHz in the case of the molded electrode which used the 1,2-polybutadiene copolymer of the present invention as a binder, while the impedance was 890 Ω in the case of the molded electrode which used the polytetrafluoroethylene of the comparative example, which indicated that the molded electrode of the present invention showed a lower impedance, and that a molded electrode showing a high electrode reactivity was obtained.

Example 22

A molded electrode was constituted in the same manner as in Example 16 except that a natural graphite was used as an electrode active material instead of the $LiCoO_2$, and the electrode properties were examined.

As a result, when the molded electrode obtained without adding a binder was used, the natural graphite which was an electrode active material dropped off into the electrolyte during the measurement due to the poor processibility of the electrode, making it impossible to measure the impedance. In addition, as a result of the AC impedance measurement conducted when the 1,2-polybutadiene copolymer of the present invention and the polytetrafluoroethylene of the comparative example were used as binders, the impedance was 350 Ω at 10 mHz in the case of the molded electrode which used the 1,2-polybutadiene copolymer of the present invention as a binder, while the impedance was 520 Ω in the case of the molded electrode which used the polytetrafluoroethylene of the comparative example, which indicated that the molded electrode of the present invention showed a lower impedance, and that a molded electrode showing a high electrode reactivity was obtained.

Example 23

A molded electrode was obtained by using the $LiCoO_2$ obtained in Example 15 as the electron-lithium ion mixed conductor, using the amorphous solid electrolyte represented by $0.01Li_3PO_4$-$0.63Li_2S$-$0.36SiS_2$ obtained in Example 5 as the lithium ion conductive inorganic solid electrolyte and using the (R-2) as the 1,2-polybutadiene copolymer. The details will be described as follows.

The molded electrode was obtained from the solid electrolyte obtained in Example 5, the $LiCoO_2$ obtained in Example 15 and the 1,2-polybutadiene copolymer (R-2) by the following method.

First, the solid electrolyte obtained above was pulverized to be 350 mesh or finer. The solid electrolyte powder, the $LiCoO_2$ powder and a toluene solution of the R-2 were well kneaded to form a slurry. The mixing ratio at the kneading was controlled such that the solid content of the hydrogenated block copolymer, the solid electrolyte powder and the $LiCo_2O_4$ powder were in a weight ratio of 1:32:67. The slurry thus obtained was applied on a fluorine resin plate by the doctor blade method and dried by evaporating toluene under a reduced pressure of 100° C. After drying for three hours, by removing from the fluorine resin plate and cutting, a molded electrode having a diameter of 10 $\phi$ and a thickness of 0.2 mm was obtained.

For comparison, a molded electrode was obtained in the same manner by using a toluene solution of the styrene-ethylene-butylene-styrene block copolymer used in Comparative Example 1 instead of the 1,2-polybutadiene copolymer used in the present example.

Furthermore, for comparison, a molded electrode was obtained by pressure molding a mixture of the $LiCoO_2$ and the solid electrolyte into a disk having a diameter of 10 mm$\phi$ and a thickness of 0.2 mm, without adding a binder such as the 1,2-polybutadiene copolymer.

The electrochemical properties of the molded electrodes thus obtained were evaluated by the following AC impedance method.

Figure 3:
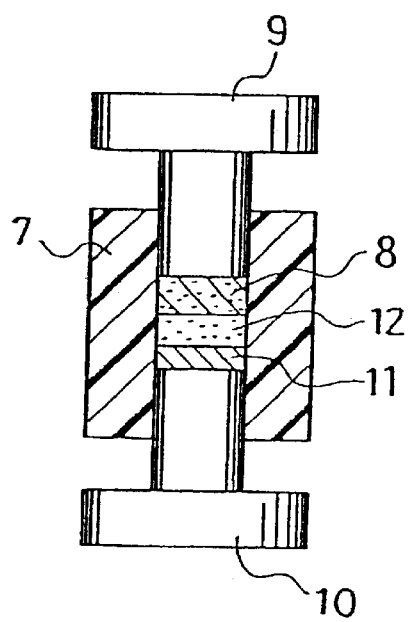
FIG. 3 is a conceptual illustration of a device to evaluate the electrochemical properties of the molded electrode of one example of the present invention.

FIG. 3 shows the conceptual diagram of a measuring device. In the drawing, numeral 7 represents a hollow sample holder made of polyethylene terephthalate, and a molded electrode 8 was pressed and adhered onto a lead terminal 9 to form a test electrode. The test electrode and a counter electrode 11 made by pressing and adhering a metallic lithium foil onto a lead terminal 10 were integrally molded via the above-mentioned lithium ion conductive solid electrolyte 12 to provide a measuring battery. The measuring battery was applied with a 10 mV AC voltage by an impedance analyzer to measure the AC impedance within a frequency range of 100 kHz to 1 mHz.

Figure 4:
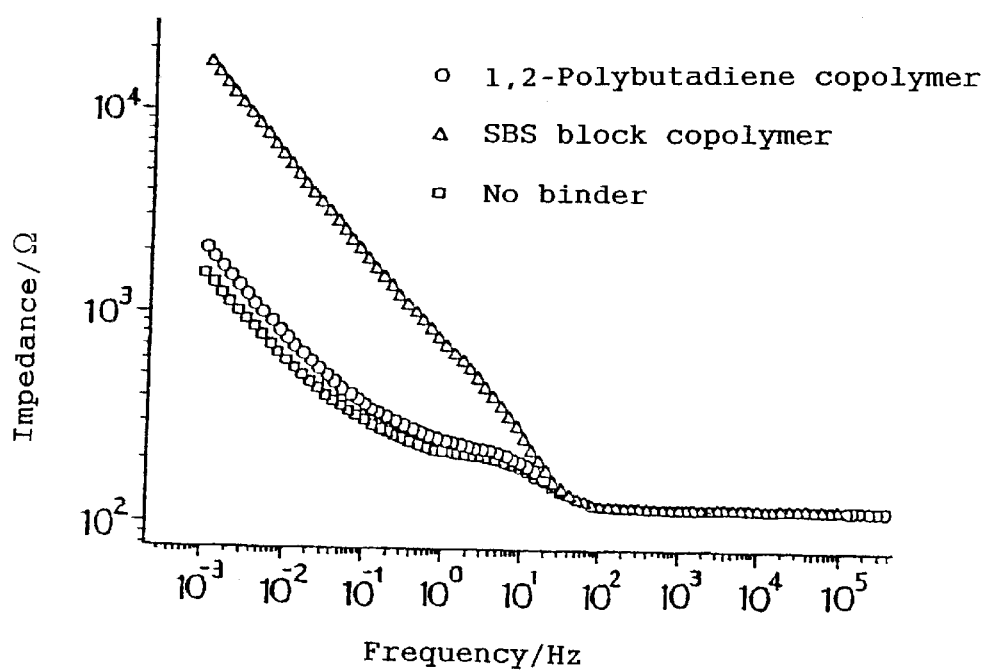
FIG. 4 is the AC impedance spectra of the molded electrodes of one example of the present invention and of one comparative example.

The resultant impedance spectrums are shown in FIG. 4. As apparent from this drawing, when the 1,2-polybutadiene copolymer of the present invention was used as a binder, the impedance showed a higher value than in the case with no binder, but showed a lower value than in the case where the styrene-ethylene-butylene-styrene block copolymer was used as a binder, which indicated that a molded electrode showing a high electrode reactivity was obtained.

Then, the processibility of these molded electrodes were evaluated by a drop test. According to the drop test, the molded electrodes were dropped on a marble plate from 50 cm high to observe the molded electrodes after dropped.

As a result, no discernible faults were found in the one produced by using the 1,2-polybutadiene copolymer of the present invention as a binder and the one produced by using the styrene-ethylene-butylene-styrene block copolymer as a binder; however, the one using no binder suffered from cracks.

Example 24

A molded electrode was obtained by using the $LiNiO_2$ obtained in Example 19 as the electron-lithium ion mixed conductor, using the amorphous solid electrolyte represented by $0.05Li_2$-$0.60Li_2S$-$0.35SiS_2$ obtained in Example 6 instead of the $0.01Li_3PO_4$-$0.63Li_2S$-$0.36SiS_2$ obtained in Example 5 as the lithium ion conductive inorganic solid electrolyte and using the R-1 as the 1,2-polybutadiene copolymer. The details will be described as follows.

The molded electrode was obtained in the same manner as in Example 23 from the solid electrolyte obtained in Example 6, $LiNiO_2$ obtained in Example 19 and 1,2-polybutadiene copolymer (R-1).

For comparison, a molded electrode was obtained in the same manner by using a toluene solution of the styrene-ethylene-butylene-styrene block copolymer instead of the 1,2-polybutadiene copolymer used in the present example.

Furthermore, for comparison, a molded electrode was obtained by pressure molding a mixture of the $LiNiO_2$ and the solid electrolyte into a disk having a diameter of 10 mm$\phi$ and a thickness of 0.2 mm without adding a binder such as the 1,2-polybutadiene copolymer.

The electrochemical properties of the molded electrodes thus obtained were evaluated by the same AC impedance method as in Example 23. As a result, the impedance was $3.1 \times 10^3$ $\Omega$ at 10 mHz when the 1,2-polybutadiene copolymer of the present invention was-used as a binder. In contrast, the impedance was $1.7 \times 10^3$ $\Omega$ when no binder was used, and $5.4 \times 10^3$ $\Omega$ when the styrene-ethylene-butylene-styrene copolymer was used, showing a lower value than in the case where the styrene-ethylene-butylene-styrene copolymer was used as a binder although it was higher than in the case with no binder, which indicated that a molded electrode showing a high electrode reactivity was obtained.

Then, the processibilitys of these molded electrodes were evaluated in the same manner as in Example 23 to find that no discernible faults were found in the one produced by using the 1,2-polybutadiene copolymer of the present invention as a binder and the one produced by using the styrene-ethylene-butylene-styrene block copolymer as a binder; however, the one using no binder suffered from cracks.

Example 25

A molded electrode was composed in the same manner as in Example 23 except that a crystalline lithium ion conductive solid electrolyte represented by $Li_{1.3}Al_{0.3}Ti_{1.7}(PO_4)_3$ was used instead of the amorphous solid electrolyte represented by $0.01Li_3PO_4$-$0.63Li_2S$-$0.36SiS_2$ obtained in Example 23 as the lithium ion conductive inorganic solid electrolyte. The details will be described as follows.

As the raw materials of the solid electrolyte, lithium carbonate, aluminum oxide, titanium oxide and orthophosphoric acid were used. After these starting materials were mixed, the mixture was pressure molded to a pellet and sintered for 24 hours at 1300° C. to obtain a crystalline lithium ion conductive inorganic solid electrolyte represented by $Li_{1.3}Al_{0.3}Ti_{1.7}(PO_4)_3$.

A molded electrode was obtained in the same manner as in Example 23 except that this solid electrolyte was used instead of the amorphous solid electrolyte represented by $0.01Li_3PO_4$-$0.63Li_2S$-$0.36SiS_2$.

For comparison, a molded electrode was obtained in the same manner by using a dispersion of the polytetrafluoroethylene instead of the 1,2-polybutadiene copolymer of the present example.

The electrochemical properties of the molded electrodes thus obtained were evaluated by the same AC impedance method as in Example 23. As a result, the impedance of the molded electrode using the 1,2-polybutadiene copolymer was $2.7 \times 10^{-3}$ $\Omega$ at 10 mHz, and the impedance of the molded electrode using the polytetrafluoroethylene was $4.8 \times 10^{-3}$ $\Omega$. From these results, it was found that the molded electrode using the hydrogenated block copolymer of the present invention as a binder showed a lower impedance.

Then, the processibility of these molded electrodes were evaluated in the same manner as in Example 23 to find that the one using the 1,2-polybutadiene copolymer of the present invention as a binder and the molded electrode using the polytetrafluoroethylene as a binder were not broken.

As described hereinbefore, from Examples 15 through 25 it has been found that the present invention can provide a molded electrode having high electrode reaction property and excellent processibility.

Example 26

A molded electrode was obtained by using the lithium cobalt oxide represented by $LiCoO_2$ used in Example 15 as the electron-lithium ion mixed conductor, using the (R-2) as the 1,2-polybutadiene copolymer, and further using polyethylene mesh as the structural member. The details will be described as follows.

The slurry containing the $LiCoO_2$ and the 1,2-polybutadiene copolymer was obtained in the same manner as in Example 15. Then, the slurry was filled into the openings of the polyethylene mesh having an open air ratio of 70% by the doctor blade method. After this, it was dried by evaporating toluene under a reduced pressure at 120° C. to obtain the molded electrode.

The AC impedance of the molded electrode was measured in the same manner as in Example 15 to find approximately the same impedance as that of the molded electrode obtained in Example 15.

Moreover, as the evaluation of the processibility of the molded electrode, in order to check the flexibility, a bending test was conducted. In the bending test, the molded electrode was wound around a 40 mm$\Omega$ stainless steel rod, and visual observations of the condition of the molded article were made. As a result, the molded electrode of the present example did not show any discernible fault in the bending test, indicating high flexibility. In contrast, the same bending test was applied to the molded electrode obtained in Example 15 to find that the molded article suffered from cracks.

Example 27

A molded electrode was produced in the same manner as in Example 26 except that the LiNiO$_2$ obtained in Example 19 was used instead of the LiCoO$_2$ used in Example 26 as the electron-lithium ion mixed conductor, that the (R-2) was used as the 1,2-polybutadiene copolymer in the same manner as in Example 26, and that a stainless steel mesh was used instead of the polyethylene mesh used in Example 26 as the structural member.

The AC impedance of the molded electrode was measured in the same manner as in Example 15 to find that the value was 370 Ω, which was lower than the impedance of the molded electrode obtained in Example 19.

Then, as the evaluation of the processibility of the molded electrode, in order to check the flexibility, a bending test was conducted. In the bending test, the molded electrode was wound around a 40 mmΩ stainless rod, and visual observations of the condition of the molded article were made. As a result, the molded electrode of the present example did not show any discernible fault in the bending test, indicating high flexibility. In contrast, the same bending test was applied to the molded electrode obtained in Example 19 to find that the molded article suffered from cracks.

As described hereinbefore, from Examples 26 and 27 it has been found that the present invention using the 1,2-polybutadiene copolymer, electrode active material and structural member can provide a molded electrode having high processibility and a high electrochemical reaction property.

Example 28

A lithium battery was obtained by using the molded electrode obtained in Example 15 as the positive electrode, the molded electrode obtained in Example 22 as the negative electrode and a lithium ion conductive electrolyte containing a mixture solvent of propylene carbonate (PC) and dimethoxyethane (DME) and lithium phosphorus hexafluoride dissolved in the mixture solvent as a lithium ion conductive electrolyte. The details will be described as follows.

First, the molded electrode obtained in Example 15 and the molded electrode obtained in Example 22 were cut into a molded positive electrode and a molded negative electrode.

The lithium ion conductive liquid electrolyte was prepared by dissolving the lithium phosphorus hexafluoride (LiPF$_6$) at a concentration of 1.0 M in the mixture solvent of the propylene carbonate (PC) and the dimethoxyethane (DME) in a ratio of 1:1.

Figure 5:
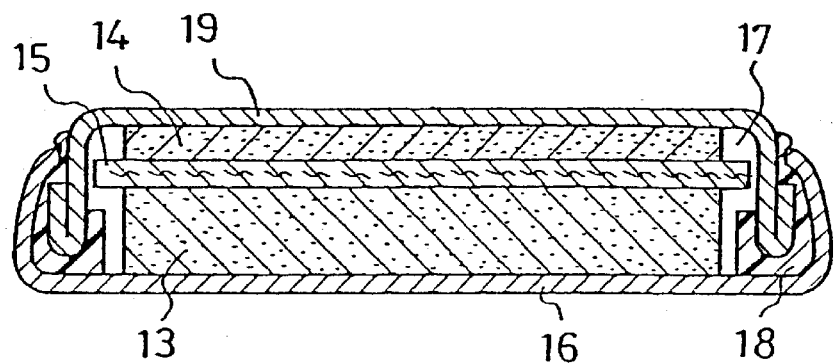
FIG. 5 is a cross sectional view of the lithium battery of one example of the present invention.

By interposing a porous polyethylene separator and a lithium ion conductive electrolyte between the molded positive electrode and the molded negative electrode thus obtained, the lithium battery having the cross section shown in FIG. 5 was composed. In FIG. 5, numeral 13 represents a molded positive electrode and 14 represents a molded negative electrode which are arranged to face each other with a polyethylene nonwoven fabric separator 15 therebetween inside a battery case 16. Furthermore, a lithium ion conductive electrolyte 17 was added dropwise, and the entire case was sealed with a battery lid 19 via a gasket 18.

Furthermore, for comparison, a lithium battery was produced by using the molded positive electrode and the molded negative electrode which used as a binder the polytetrafluoroethylene obtained in Example 15 and Example 22 for comparison in place of the molded positive electrode and the molded negative electrode used in the present example.

Furthermore, for comparison, a lithium battery was composed by the following method, by using a polymer solid electrolyte as a binder in place of the 1,2-polybutadiene copolymer used in the present example.

As the polymer solid electrolyte, lithium perchlorate (LiClO$_4$)/polyethylene oxide (PEO) type was used. First, the PEO was dissolved in acetonitrile, and then the LiClO$_4$ was also dissolved. The mixing ratio of the PEO to the LiCl04 was controlled such that the lithium in the LiClO$_4$ became 1/50 to the oxygen in the PEO. A molded positive electrode and a molded negative electrode were prepared in the same manner as above except that the solution thus obtained was used, and a lithium battery was composed by using these molded electrodes.

The lithium battery thus composed was charged at a current value of 1 mA up to 4.2 V. After the charging, the Internal impedance of the battery was measured by the AC impedance method (applied AC voltage: 10 mV, AC frequency: 1 Hz), and then a charging and discharge test was conducted at a current value of 1 mA within the range of 3.0 V to 4.2 V.

As a result, in the lithium battery using the polymer solid electrolyte, an anomaly was observed in the charging curve during the charging of the battery. When the battery was decomposed to find the cause, neither the positive electrode nor the negative electrode retained their shape at the time of the assembly of the battery, and the electrodes were extremely swelled and the current collectivity of the active material was lost. The reason for this was considered that the processibility of the electrodes was lost due to the polymer solid electrolyte having been dissolved in the electrolyte.

Figure 6:
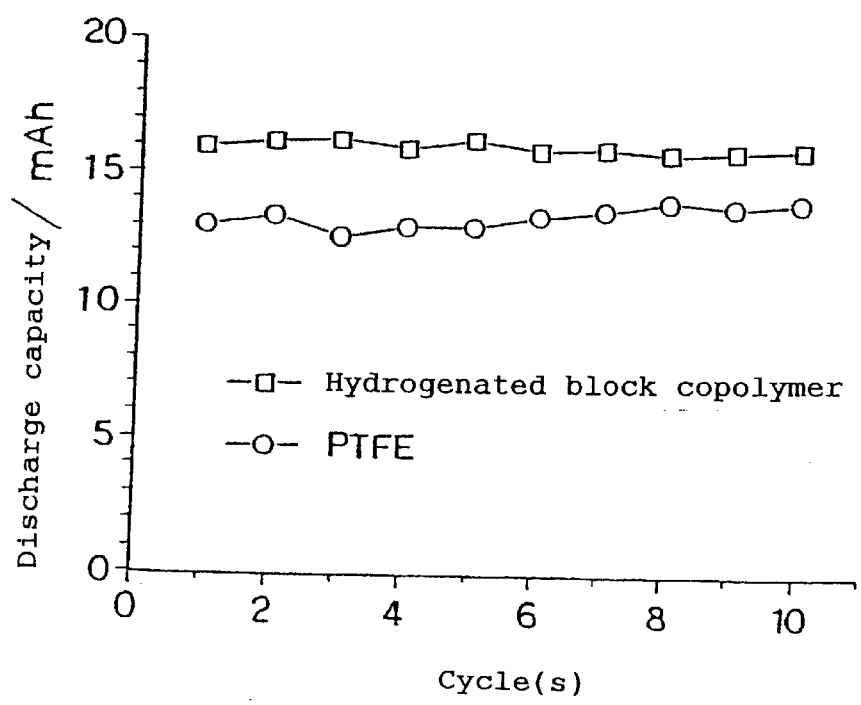
FIG. 6 is a diagram showing the charging and discharging cycle characteristics of the lithium batteries of one example of the present invention and of one comparative example.

With respect to the lithium battery which uses the 1,2-polybutadiene copolymer of the present invention as a binder and the lithium battery which uses the PTFE as a binder, the internal impedance of the batteries obtained in the above test and the discharge capacity in each charging and discharging cycle are shown in Table 6 and FIG. 6, respectively. No decrease in discharge capacity was observed along with the charging and discharging cycle in either lithium battery; however, the lithium battery which used the 1,2-polybutadiene copolymer of the present invention showed a lower internal impedance and large discharge capacity.

As described hereinbefore, it has been found that the present invention can provide a lithium battery which can improve the processibility of the electrodes without largely damaging the ionic conductivity inside the battery, thereby showing excellent battery properties.

TABLE 6

|  | Internal impedance (Ω) |
|---|---|
| With 1,2-polybutadiene copolymer | 59 |
| With PTFE | 102 |

Example 29

A lithium battery of the present invention was composed in the same manner as in Example 28 except that the molded electrode obtained in Example 16 was used as the molded electrode used for the positive electrode, and its properties were evaluated.

As a result, the lithium battery to which the 1,2-polybutadiene copolymer was added according to the present invention showed a discharge capacity of 14 mAh or higher and an internal impedance of 63 Ω, and showed a higher discharge capacity and a lower internal impedance than the lithium battery composed using the PTFE as a binder for comparison in Example 28.

Example 30

A lithium battery of the present invention was composed in the same manner as in Example 28 except that the molded electrode obtained in Example 19 was used as the molded electrode used for the positive electrode, and its properties were evaluated.

Furthermore, for comparison, a lithium battery was composed by using the molded electrode which used the SEBS as a binder obtained as the positive electrode for comparison in Example 19, and its properties were evaluated.

As a result, the discharge capacity and internal impedance of the lithium battery to which the 1,2-polybutadiene was added according to the present invention were 18 mAh and 85 Ω, respectively. In contrast, in the lithium battery composed for comparison using the PTFE as a binder, the discharge capacity and the internal impedance were 16 mAh and 98 Ω, respectively, which indicated that the lithium battery of the present invention showed a higher discharge capacity and a lower internal impedance.

As described hereinbefore, from Examples 29 and 30, it has been found that that the present invention can provide a lithium battery which can improve the processibility of the electrodes without largely damaging the ionic conductivity inside the battery, thereby showing excellent battery properties.

Example 31

A lithium battery was composed by using as the positive electrode the molded electrode composed in the same manner as in Example 15 except that titanium disulfide represented by $TiS_2$ was used instead of the lithium cobalt oxide represented by $LiCoO_2$ as the positive electrode active material and using metallic lithium instead of the natural graphite used in Example 29 as the negative electrode active material. The details will be described as follows.

First, the $TiS_2$ was synthesized from metallic titanium and sulfur by a CVD process.

Then, the $TiS_2$ obtained above was pulverized to be 350 mesh or finer. A molded electrode was obtained in the same manner as in Example 15 by using the $TiS_2$ powder instead of the $LiCoO_2$ powder. A lithium battery of the present invention was composed in the same manner as in Example 29 except that this molded electrode was used as the positive electrode, and that a metallic lithium foil was used instead of the molded negative electrode used in Example 29. For comparison, a lithium battery was composed by using the PTFE instead of the 1,2-polybutadiene copolymer (R-1).

The lithium battery thus composed was discharged at a current value of 500 μA to decrease to 1.8 V. After the discharging, the internal impedance of the battery was measured by the AC impedance method (applied AC voltage: 10 mV, AC frequency: 1 Hz), and then a charging and discharging test was conducted at a current value of 500 μA within the range of 1.8 V to 2.8 V.

As a result, the discharge capacity and internal impedance of the lithium battery which used the 1,2-polybutadiene copolymer of the present invention were 28 mAh and 71 Ω, respectively, and in the lithium battery which used the PTFE, on the other hand, they were 23 mAh and 86 Ω, respectively.

From these results, it has been found that the lithium battery of the present invention showed a lower internal impedance and a higher discharge capacity.

Example 32

A lithium battery was composed in the same manner as in Example 26 except that the molded electrode obtained in Example 20 was used as the positive electrode instead of the molded electrode obtained in Example 16 which was used in Example 29.

Furthermore, for comparison, a lithium battery was composed in the same manner as above except that the molded electrode using the PTFE as a binder obtained for comparison in Example 16 was used as the positive electrode.

As a result, the discharge capacity and internal impedance of the lithium battery which used the 1,2-polybutadiene copolymer of the present invention were 11 mAh and 230 Ω, respectively, and in the lithium battery which used the PTFE, on the other hand, they were 8.5 mAh and 340 Ω, respectively. From these results, it has been found that the lithium battery of the present invention showed a lower internal impedance and a higher discharge capacity.

Example 33

A lithium battery of the present invention and a lithium battery for comparison were composed in the same manner as in Example 29 except that an electrolyte containing the mixture solvent of propylene carbonate and dimethoxyethane used in Example 29 and the $LiClO_4$ dissolved in the mixture solvent as the lithium ion conductive electrolyte.

As a result, the discharge capacity and internal impedance of the lithium battery which used the 1,2-polybutadiene copolymer of the present invention were 13 mAh and 64 Ω, respectively, and in the lithium battery which used the PTFE, on the other hand, they were 11 mAh and 71 Ω, respectively.

As described hereinbefore, it has been found that the present invention can provide a lithium battery which can improve the processibility of the electrodes without largely damaging the ionic conductivity inside the battery, thereby showing excellent battery properties.

Example 34

A lithium battery was composed in the same manner as in Example 28 except that the molded electrode using the stainless steel mesh obtained in Example 27 was used as the positive electrode in order to further enhance the processibility of the electrode, and that the molded negative electrode using the stainless steel mesh described below was used.

The molded negative electrode was obtained by filling a slurry containing the natural graphite obtained in Example 22 and the (R-2) into the stainless steel mesh, and evaporating toluene under a reduced pressure of 100° C. to be dried.

A lithium battery was composed in the same manner as in Example 28 by using the molded negative electrode thus obtained, and the molded electrode obtained in Example 27 as the positive electrode.

The properties of the lithium battery thus composed were evaluated in the same manner as in Example 28 to find that no decrease in discharge capacity was observed along with the charging and discharging cycle, and that the discharge capacity and internal impedance of the lithium battery using the structural member obtained in the present example were 17 mAh and 49 Ω, respectively, which indicated that the lithium battery obtained in the present example showed a lower internal impedance and a higher discharge capacity.

Example 35

In Example 28 through Example 34, the examples of composing lithium batteries as electrochemical devices were described; however, in the present example, an example of composing a nickel-cadmium battery as the electrochemical device will be described.

First, a molded electrode used as the negative electrode was composed by the following method.

Cadmium oxide powder and a toluene solution of the (R-2) as the 1,2-polybutadiene copolymer were mixed in a manner that the cadmium oxide and the copolymer were in a weight ratio of 95:5. The slurry thus prepared was applied on and filled into a nickel-plated iron punched metal sheet as the electron conductive structural member, and toluene was evaporated at 100° C. to obtain the molded electrode.

Then, a molded electrode used as the positive electrode was composed by the following method.

Nickel hydroxide, metallic cobalt powder and a toluene solution of the (R-2) were mixed in a manner that the nickel hydroxide, metallic cobalt and copolymer were in a weight ratio of 90:5:5. The slurry thus prepared was filled into a nickel foamed body as the electron conductive structural member, and toluene was evaporated at 100° C. to obtain the molded electrode.

A nickel-cadmium battery was composed by using the positive electrode and negative electrode thus obtained, and further using polyamide fiber nonwoven fabric as the separator and an aqueous solution of 7 N KOH as the electrolyte.

The charging and discharging performance and rate properties of the nickel-cadmium battery thus composed were examined to find them as good as those of conventional batteries.

As described hereinbefore, it has been found that the 1,2-polybutadiene copolymer can be applied as a binder used in an electrochemical device using a water-soluble electrolyte.

Example 36

An all-solid state lithium battery was obtained by using the (R-1) as the 1,2-polybutadiene copolymer, the lithium cobalt oxide represented by $LiCoO_2$ as the positive electrode active material, indium as the negative electrode active material, and the amorphous solid electrolyte represented by $0.01Li_3PO_4$-$0.63Li_2S$-$0.36SiS_2$ as the lithium ion conductive electrolyte. The details will be described as follows.

As the lithium ion conductive solid electrolyte, the one obtained in Example 5, and as the $LiCoO_2$, the one obtained in Example 15 were used. In addition, as the molded solid electrolyte, the one obtained in Example 5, and as the molded electrode, the one obtained in Example 23 were used.

The all-solid state lithium battery was composed by the following method by using the lithium ion conductive solid electrolyte, $LiCoO_2$, molded solid electrolyte and molded electrode.

Figure 7:
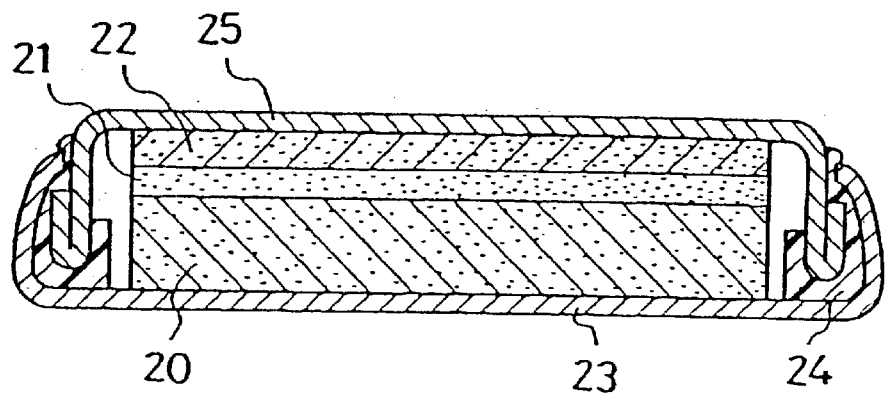
FIG. 7 is a cross sectional view of the all-solid state lithium battery of one example of the present invention.

First, for comparison, an all-solid state lithium battery "A" having a cross section shown in FIG. 7 was composed by using a lithium ion conductive solid electrolyte powder and a positive electrode material, without adding the 1,2-polybutadiene copolymer. In FIG. 7, numeral 20 is a positive electrode and numeral 21 is a lithium ion conductive solid electrolyte layer, which were pressure molded integrally with a metallic indium foil 22 as a negative electrode. This integrally molded pellet was put in a stainless battery case 23 and sealed with a stainless lid 25 via an insulating gasket 24.

Then, a lithium battery "B" of the present invention was composed in the same manner as above except that the lithium ion conductive molded solid electrolyte obtained in Example 5 was used instead of the above lithium ion conductive solid electrolyte powder.

Furthermore, a lithium battery "C" of the present invention was composed in the same manner as the lithium battery "A" except that the molded electrode obtained in Example 23 was used instead of the positive electrode used in the above-mentioned lithium battery "A".

In addition, a lithium battery "D" of the present invention was composed in the same manner as the lithium battery "A" except that a lithium ion conductive molded solid electrolyte and a molded electrode were used instead of the lithium ion conductive solid electrolyte powder and the positive electrode material used in the lithium battery "A".

Then, for comparison, by using an isoprene-styrene random copolymer instead of the 1,2-polybutadiene copolymer used in the present example, and further using a molded solid electrolyte and a molded electrode obtained in the same manner as in Example 5 and Example 23, a lithium battery "E" (the solid electrolyte layer is the molded solid electrolyte), a lithium battery "F" (the positive electrode layer is the molded electrode) and a lithium battery "G" (the solid electrolyte layer and the positive electrode layer are the molded solid electrolyte and the molded electrode, respectively) were composed.

The lithium batteries thus composed were charged at a current value of 300 µA up to 3.7 V. After charging, the internal impedance of the battery was measured by the AC impedance method (applied AC voltage: 10 mV, AC frequency: 1 Hz), and then a charging and discharging test was conducted at a current value of 300 µA within the range of 2.0 V to 3.8 V.

Figure 8:
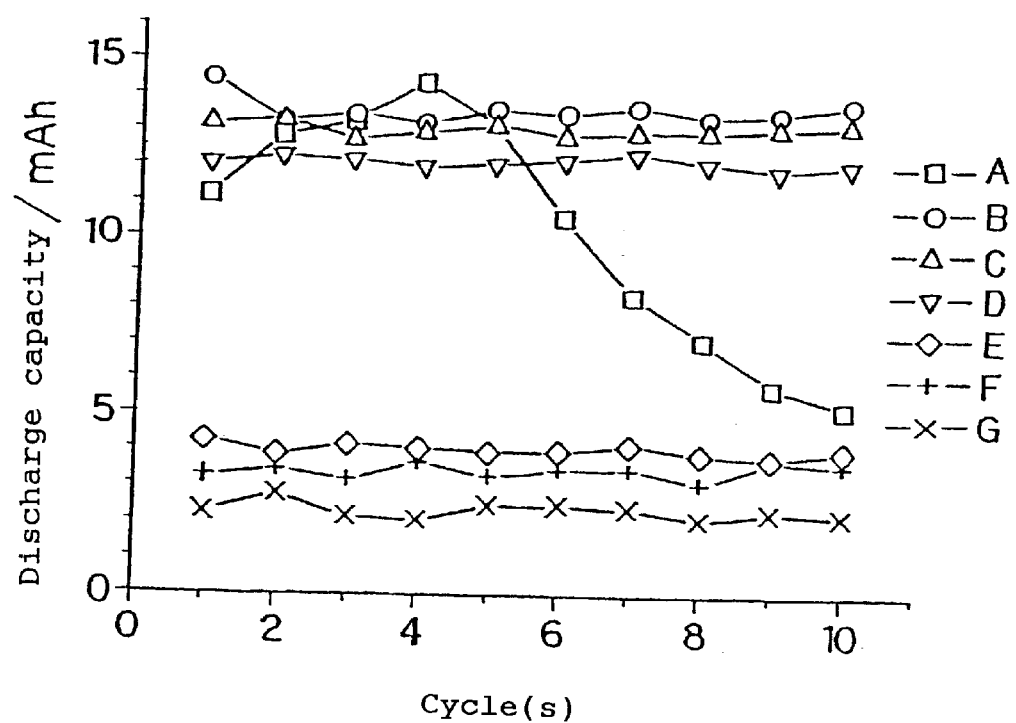
FIG. 8 is a diagram showing the charging and discharging cycle characteristics of the all-state solid lithium batteries of one example of the present invention and of one comparative example.

The internal impedance of the battery obtained is shown in Table 7, and the discharge capacity of each charging and discharging cycle is shown in FIG. 8. In the lithium batteries "B", "C" and "D" of the present invention, the internal impedances are higher than in the lithium battery "A"; however, a decrease in discharge capacity along with the charging and discharging cycle was hardly observed. In contrast, in the lithium battery "A" to which a hydrogenated block copolymer was not added, a decrease in capacity along with the charging and discharging cycle was remarkable. In order to find the cause, the cross section was observed with an X-ray CT and cracks were observed in the pellet inside the battery, and it was considered that a poor binding condition inside the battery due to the volume change of the electrodes along with the charging and discharging was the cause of the capacity decrease. On the other hand, in the lithium batteries "E", "F" and "G" using the SEBS as a binder of the molded electrodes, the internal impedances after charging showed high values, and the discharge capacities were also small although the decrease along with the charging and discharging cycle was minor. The reason for this is considered that the added polymer disturbed the ionic conductivity inside the battery, which resulted in an increase in the internal impedance of the battery thereby increasing an overvoltage during charging and discharging, and decreasing the discharge capacity.

TABLE 7

| | Internal impedance (Ω) |
|---|---|
| Lithium battery A | 340 |
| Lithium battery B | 440 |
| Lithium battery C | 590 |
| Lithium battery D | 710 |
| Lithium battery E | 2500 |
| Lithium battery F | 3100 |
| Lithium battery G | 3800 |

TABLE 8

| | Internal impedance (Ω) |
|---|---|
| Lithium battery H | 430 |
| Lithium battery I | 530 |
| Lithium battery J | 660 |
| Lithium battery K | 770 |
| Lithium battery L | 2800 |
| Lithium battery M | 3300 |
| Lithium battery N | 3900 |

Example 37

In the same manner as in Example 36 except that the molded electrode obtained in Example 24 was used instead of the molded electrode used in Example 36 as the positive electrode, and that the molded solid electrolyte obtained in Example 6 was used instead of the molded solid electrolyte used in Example 36 as the solid electrolyte layer, an all-solid state lithium battery "H" for comparison (without a 1,2-polybutadiene copolymer), an all-solid state lithium battery "I" (the solid electrolyte layer is the molded solid electrolyte), a lithium battery "J" (the positive electrode layer is the molded electrode) and a lithium battery "K" (the solid electrolyte layer and the positive electrode layer are the molded solid electrolyte and the molded electrode, respectively) of the present invention were composed, and their properties were evaluated.

Furthermore, for comparison, by using as the molded electrode the molded electrode using the SEBS as a binder which was composed for comparison in Example 24, and using a molded solid electrolyte containing 3.5 wt % of the SEBS obtained in Comparative Example 1, an all-solid state lithium battery "L" (the solid electrolyte layer is the molded solid electrolyte), a lithium battery "M" (the positive electrode layer is the molded electrode) and a lithium battery "N" (the solid electrolyte layer and the positive electrode layer are the molded solid electrolyte and the molded electrode, respectively) were composed.

As a result, as shown in Table 8, as to the lithium batteries "I", "J" and "K" of the present invention, a decrease in discharge capacity was hardly observed along with the charging and discharging cycle although the internal impedances were higher than in the lithium battery "H". In contrastas to the lithium battery "H" to which the 1,2-polybutadiene copolymer was not added, a decrease in capacity along with the charging and discharging cycle was remarkable. In order to find the cause, the cross section was observed with an X-ray CT and cracks were observed in the pellet inside the battery, and it was considered that a poor binding condition inside the battery due to the volume change of the electrodes along with the charging and discharging was the cause of the capacity decrease. On the other hand, in the lithium batteries "L", "M" and "N" using the SEBS, the internal impedances after charging showed high values, and the discharge capacities were also small although the decrease along with the charging and discharging cycle was minor. The reason for this is considered that the added polymer disturbed the ionic conductivity inside the battery, which resulted in an increase in the internal impedance of the battery thereby increasing an overvoltage during charging and-discharging, and decreasing the discharge capacity.

Example 38

An all-solid state lithium battery was composed by using the titanium disulfide represented by $TiS_2$ obtained in Example 31 instead of the lithium cobalt oxide represented by $LiCoO_2$ used in Example 36 as the positive electrode active material, using metallic lithium instead of the indium used in Example 36 as the negative electrode active material and using the (R-2) as the 1,2-polybudadiene copolymer. The details will be described as follows.

The $TiS_2$ obtained in Example 31 was pulverized to be 350 mesh or finer. A molded electrode was composed in the same manner as in Example 23 except that the $TiS_2$ powder obtained in this manner was used instead of the $LiCoO_2$ powder, and a lithium battery of the present invention was composed by using this molded electrode and a metallic lithium foil. In addition, for comparison, a lithium battery to which no 1,2-polybutadiene copolymer was added, and a lithium battery using the SEBS instead of the 1,2-polybutadiene copolymer were composed.

The lithium battery thus composed was discharged at a current value of 100 μA to 1.8 V. After discharging, the internal impedance of the battery was measured by the AC impedance method (applied AC voltage: 10 mV, AC frequency: 1 Hz), and then a charging and discharging test was conducted at a current value of 100 μA within the range of 1.8 V to 2.8 V.

As a result, the lithium battery containing the 1,2-polybutadiene copolymer either in the solid electrolyte layer or the positive electrode layer showed a slightly higher internal impedance than the battery having no 1,2-polybutadiene copolymer but the value was 1 KΩ or lower, and a decrease in discharge capacity along with the charging and discharging cycle was hardly observed. On the other hand, in the battery using the SEBS as a binder, the internal impedance after charging showed a value of 2 kΩ or higher. Although there was only a minor decrease along with the charging and discharging cycle, the discharge capacity also became small.

Example 39

An all-solid state lithium battery was composed in the same manner as in Example 36 except that the molded electrode using the lithium manganese oxide represented by $LiMn_2O_4$ obtained in Example 20 was used as the positive electrode instead of the lithium cobalt oxide represented by $LiCoO_2$ obtained in Example 36. The details will be described as follows.

First, the $LiMn_2O_4$ obtained in Example 20 was pulverized to be 350 mesh or finer. This $LiMn_2O_4$ powder, solid electrolyte powder obtained in Example 5 and graphite powder as the electron conductive material were mixed in a weight ratio of 6:3:1 to obtain a positive electrode material.

A molded electrode was composed in the same manner as in Example 23 except that the positive electrode material thus obtained was used, and a lithium battery was composed by using this molded electrode.

Furthermore, for comparison, a lithium battery was composed without adding the 1,2-polybutadiene copolymer, a lithium battery was composed by using the SEBS instead of the 1,2-polybutadiene copolymer, and their properties were evaluated.

As a result, the lithium battery containing the 1,2-polybutadiene copolymer either in the solid electrolyte layer or the positive electrode layer according to the present invention showed a slightly higher internal impedance than in the battery having no 1,2-polybutadiene copolymer, but the value was 1 KΩ or lower, and a decrease in discharge capacity along with the charging and discharging cycle was hardly observed. On the other hand, in the battery using the SEBS, the internal impedance after charging showed a value of 2 kΩ or higher, and the discharge capacity was also small although the decrease along with the charging and discharging cycle was minor.

Example 40

An all-solid state lithium battery of the present invention was composed in the same manner as in Example 36 except that the molded electrode using natural graphite instead of the indium used in Example 36 was used as the negative electrode active material. The details will be described as follows.

As negative electrode materials, one obtained by mixing the natural graphite and the lithium ion conductive solid electrolyte obtained in Example 36 in a weight ratio of 9:1 was used. A molded electrode was obtained in the same manner as in Example 23 by using the negative electrode material.

A lithium battery was composed in the same manner as in Example 36 by using the molded negative electrode thus obtained, the molded positive electrode obtained in Example 23 and the lithium ion conductive molded solid electrolyte obtained in Example 5.

Furthermore, for comparison, a lithium battery was composed without adding the 1,2-polybutadiene copolymer.

The lithium battery thus composed was charged at a current value of 300 μA up to 4.2 V. After charging, the internal impedance of the battery was measured by the AC impedance method (applied AC voltage: 10 mV, AC frequency: 1 Hz), and then a charging and discharging test was conducted at a current value of 300 μA within the range of 2.5 V to 4.2 V.

As a result, the lithium battery to which the 1,2-polybutadiene copolymer was added according to the present invention showed a slightly higher internal impedance than the battery to which no hydrogenated block copolymer was added, but the value was 1 KΩ or lower, and a decrease in discharge capacity along with the charging and discharging cycle was hardly observed.

As described hereinbefore, from Examples 36 through 40, it has been found that the present invention can provide a lithium battery which can prevent a decrease in bonding performance inside the battery resulting from the volume change of the electrodes during charging and discharging, without largely damaging the ionic conductivity inside the battery, thereby showing excellent charging and discharging cycle properties.

Example 41

A lithium battery was composed by using the same positive electrode active material, negative electrode active material and electrolyte as in the lithium battery of Example 36, and using stainlessteel mesh to improve the processibility of the electrodes.

First, a slurry containing the $LiCoO_2$, $0.01Li_3PO_4$-$0.63Li_2S$-$0.36SiS_2$ and (R-2) used in Example 36 as the positive electrode active material, solid electrolyte and 1,2-polybutadiene copolymer, respectively was prepared. The slurry was filled, by the doctor blade method, into the openings of the stainless steel mesh having an open air ratio of 80% which was a structural member. Then, it was dried by evaporating toluene under a reduced pressure at 100° C. Then, it was cut into a 16 φ disk to obtain a molded positive electrode.

By using the molded positive electrode thus obtained, a lithium battery was composed in the same manner as the lithium battery "C" in Example 36.

The properties of the lithium battery thus composed were evaluated in the same manner as in Example 36 to find that there was no decrease in discharge capacity along with the charging and discharging cycle, and that the internal impedance of the lithium battery using the structural member obtained in the present invention was 460 Ω, which was a lower internal impedance than in the lithium battery C also using the molded positive electrode in Example 36. In addition, it has been also found that the discharge capacity was 14 mAh, larger than in the lithium battery "C".

As described hereinbefore, it has been found that the present invention can provide a lithium battery which enhances the processibility of the electrodes without largely damaging the ionic conductivity inside the battery, and shows excellent battery properties by adding a structural member to the electrodes.

Example 42

A lithium battery was composed by using the same positive electrode active material, negative electrode active material, electrolyte and stainless steel mesh to improve the processibility of the positive electrode as in the lithium battery in Example 41, and further using a polymer composition having a modified composition ratio of the 1,2-polybutadiene copolymer (R-3) to the acrylonitrile butadiene rubber (manufactured by JSR, trade name: N250S, the amount of bond acrylonitrile: 20%) as the polar rubber shown in Table 2.

After having been left for 12 hours in a constant temperature bath below −20° C., the lithium battery thus composed was charged with a current value of 300 μA up to 4.2 V. After charging, the internal impedance of the battery was measured by the AC impedance method (applied AC voltage: 10 mV, AC frequency: 1 Hz), and then a charging and discharging test was conducted at a current value of 300 μA within the range of 2.5 V to 4.2 V.

Figure 9:
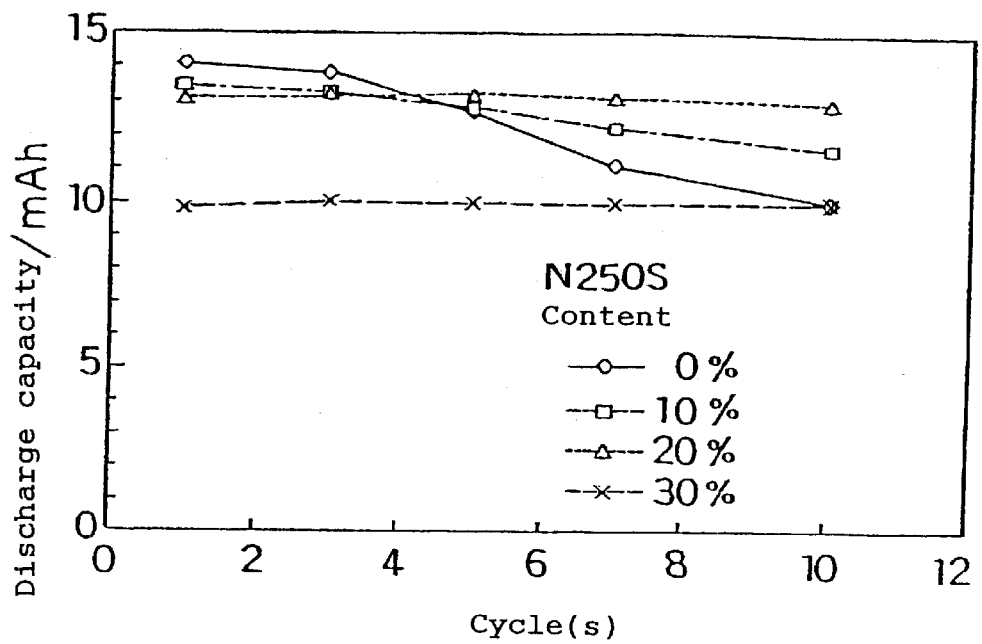
FIG. 9 is a diagram showing the charging and discharging cycle characteristics of the all-state solid lithium batteries of one example of the present invention and of one comparative example.

The resultant relation between the composition ratio of the 1,2-polybutadiene copolymer (R-3) to the acrylonitrile butadiene rubber and the internal impedance of the battery is shown in Table 9, and the discharge capacity in each charging and discharging cycle is shown in FIG. 9. As the weight ratio of the acrylonitrile butadiene rubber becomes higher, the internal impedance of the battery shows a higher value; however, the discharge capacity along with the charging and discharging has only a minor decrease ratio, and in the lithium battery where the composition ratio of the 1,2-polybutadiene copolymer (R-3) to the acrylonitrile butadiene rubber was 80:20, the obtained discharge capacity was 13 mAh even after 10 cycles. In contrast, in the lithium battery using the 1,2-polybutadiene copolymer (R-3) and not containing the acrylonitrile butadiene rubber had a discharge capacity of 10 mAh after 10 cycles.

TABLE 9

| 1,2-polybutadiene | | Polar rubber | | |
| --- | --- | --- | --- | --- |
| Type | Content | Type | Content | Internal impedance |
| R-3 | 100 | — | 0 | 500 |
| R-3 | 90 | N250S | 10 | 510 |
| R-3 | 80 | N250S | 20 | 520 |
| R-3 | 70 | N250S | 30 | 550 |

Example 43

A lithium battery was composed by using the same positive electrode active material, negative electrode active material, electrolyte and stainless steel mesh to improve the processibility of the positive electrode as in the lithium battery in Example 41, and further using a polymer composition having a changed composition ratio of the 1,2-polybutadiene copolymer (R-3) to the ethylene butadiene rubber [manufactured by Du Pont-Showa Denko Co., Ltd., trade name: VAMAC G] as the polar rubber.

After having been left for 12 hours in a constant temperature bath below 100° C., the lithium battery thus composed was charged with a current value of 300 µA up to 4.2 V. After charging, the internal impedance of the battery was measured by the AC impedance method (applied AC voltage: 10 mV, AC frequency: 1 Hz), and then a charging and discharging test was conducted at a current value of 300 µA within the range of 2.5 V to 4.2 V.

Figure 10:
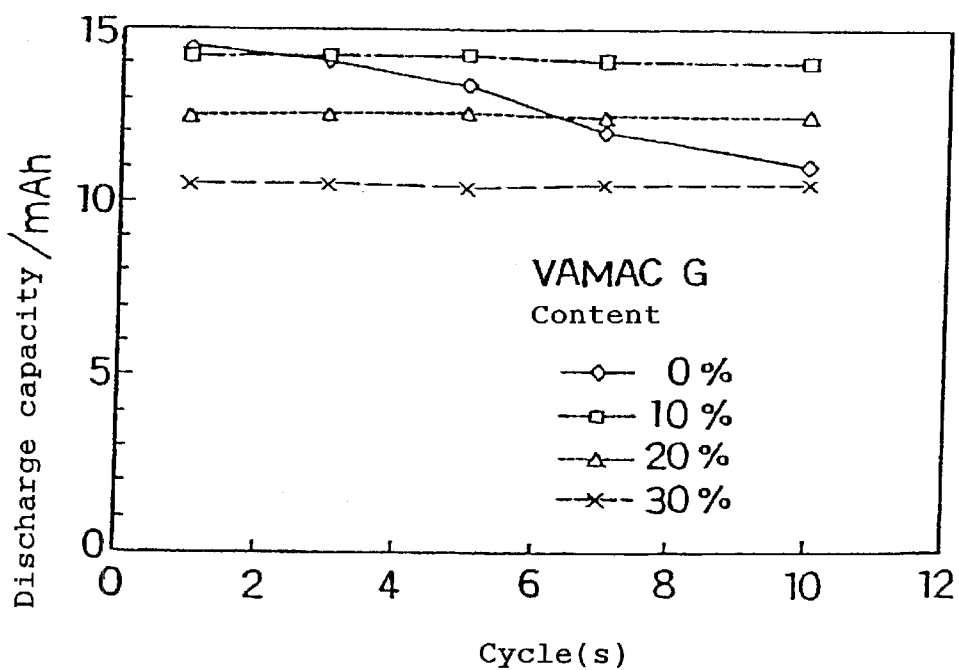
FIG. 10 is a diagram showing the charging and discharging cycle characteristics of the all-state solid lithium batteries of one example of the present invention and of one comparative example.

The resultant relation between the composition ratio of the 1,2-polybutadiene copolymer (R-2) to the ethylene acrylic rubber and the internal impedance of the battery is shown in Table 10, and the discharge capacity in each charging and discharging cycle is shown in FIG. 10. As the weight ratio of the ethylene acrylic rubber becomes higher, the internal impedance of the battery shows a higher value; however, the discharge capacity along with the charging and discharging has only a minor decrease ratio, and in the lithium battery where the composition ratio of the 1,2-polybutadiene copolymer (R-3) to the ethylene acrylic rubber was 90:10, the obtained discharge capacity was 14 mAh even after 10 cycles. In contrast, in the lithium battery using the 1,2-polybutadiene copolymer (R-3) and not containing the acrylonitrile butadiene rubber had a discharge capacity of 11 mAh after 10 cycles.

TABLE 10

| 1,2-polybutadiene | | Polar rubber | | |
| --- | --- | --- | --- | --- |
| Type | Content | Type | Content | Internal impedance |
| R-2 | 100 | — | 0 | 200 |
| R-2 | 90 | VAMAC G | 10 | 220 |
| R-2 | 80 | VAMAC G | 20 | 240 |
| R-2 | 70 | VAMAC G | 30 | 260 |

Example 44

A lithium battery was composed by using the same positive electrode active material, negative electrode active material, solid electrolyte as in the lithium "D" of Example 36 and the same stainless steel mesh to improve the processibility of the positive electrode as in the lithium battery in Example 41, and further using a polymer composition having a modified composition ratio of three components: the 1,2-polybutadiene copolymer (R-3), the acrylonitrile butadiene rubber [manufactured by JSR, trade name: N250S, the amount of bond acrylonitrile: 20%] and the ethylene butadiene rubber [manufactured by Du Pont-Showa Denko Co., Ltd., trade name VAMAC G] as the polar rubber.

After having been left for 12 hours in a constant temperature bath below −20° C., the lithium battery thus composed was subjected to a charging and discharging test in a low temperature with a current value of 300 µA in the voltage range 2.5 to 4.2 V for ten cycles. After the completion of the ten-cycle discharge, the temperature of the constant temperature bath was raised to 100° C., and then a high-temperature charging and discharging test was conducted with a current value of 300 µA within the range of 2.5 to 4.2 V for ten cycles.

The resultant composition ratio of the three components: the 1,2-polybutadiene copolymer (R-3), the acrylonitrile butadiene rubber and the ethylene butadiene rubber as the polar rubber, and the discharge capacities of the battery in the tenth cycle under a low temperature and in the tenth cycle under a high temperature are shown in Table 1 (11?).

In the lithium battery where the composition ratio between the 1,2-polybutadiene copolymer (R-3), the acrylonitrile butadiene rubber, and the ethylene butadiene rubber is 80:10:10, a decrease in discharge capacity was hardly observed after 10 cycles under a low temperature or after 10 cycles under a high temperature, and a discharge capacity of 12 mAh was obtained. In contrast, in the lithium battery where the composition ratio was 80:20:0 containing no ethylene acrylic rubber, a decrease In discharge capacity was hardly observed after 10 cycles under a low temperature, but the discharge capacity was decreased to 10 mAh after 10 cycles under a high temperature. On the other hand, in the lithium battery where the composition ratio was 80:0:20 containing no acrylonitrile butadiene rubber, the discharge capacity decreased after ten cycles under a low temperature, but it did not show any decrease after ten cycles under a high temperature, and a discharge capacity of 10 mAh was obtained.

As described hereinbefore, from Examples 42 through 44 it has been found that the present invention can provide excellent battery properties both under a low temperature and a high temperature without largely damaging the ionic conductivity inside the battery.

TABLE 11

| 1,2-polybutadiene | | Polar rubber | | Polar rubber | | Low temperature | High temperature |
|---|---|---|---|---|---|---|---|
| Type | Content | Type | Content | Type | Content | −20° C. | 100° C. |
| R-3 | 100 | — | 0 | — | 0 | 10.3 | 7.6 |
| R-3 | 80 | N250S | 20 | VAMAC G | 0 | 12.1 | 10 |
| R-3 | 80 | N250S | 15 | VAMAC G | 5 | 12.1 | 11 |
| R-3 | 80 | N250S | 10 | VAMAC G | 10 | 12.1 | 12 |
| R-3 | 80 | N250S | 5 | VAMAC G | 15 | 11.2 | 11 |
| R-3 | 80 | N250S | 0 | VAMAC G | 20 | 10.1 | 10 |

Example 45

In the present example, an example of composing an electrochromic display device as the all-solid state electrochemical device will be described using the proton conductive solid electrolyte obtained in Example 13.

Figure 11:
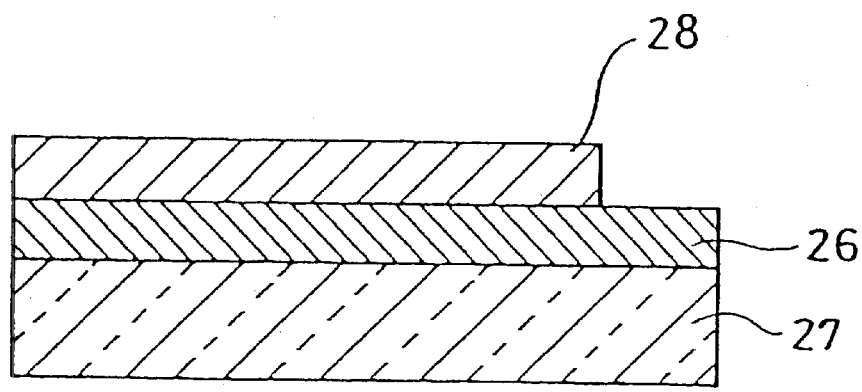
FIG. 11 is a cross sectional view of the display electrode of the electrochromic display device of one example of the present invention.

A tungsten oxide ($WO_3$) thin film was used as the display electrode of the electrochromic display device. As shown in FIG. 11, the tungsten oxide thin film 28 was formed by an electron beam vapor deposition method onto a glass substrate 27 having an ITO layer 26 formed thereon as a transparent electrode by a spattering vapor deposition method.

As the counter electrode, a tungsten oxide ($H_xWO_3$) thin film doped with the proton obtained in the following manner was used.

First, a tungsten oxide thin film was formed on a glass substrate having an ITO electrode formed thereon in the same manner as the above-mentioned display electrode. The glass substrate was dipped in an aqueous solution of chloroplatinic acid ($H_2PtCl_6$) and dried in a current of hydrogen to convert the tungsten oxide to tungsten bronze ($H_xWO_3$).

The electrolyte layer of the electrochromic display device was formed in the following method.

First, a toluene solution of the (R-1), was added to the silica gel doped with phosphorous acid obtained in Example 13. Furthermore, since the electrolyte layer also served as the reflector of the electrochromic display device, alumina powder was added by a weight ratio of 5% to the silica gel in order to whiten it. This mixture was kneaded until it became a slurry and applied as thick as 50 μm by the doctor blade method on the surface of the display electrode previously obtained to form an electrolyte layer.

Figure 12:
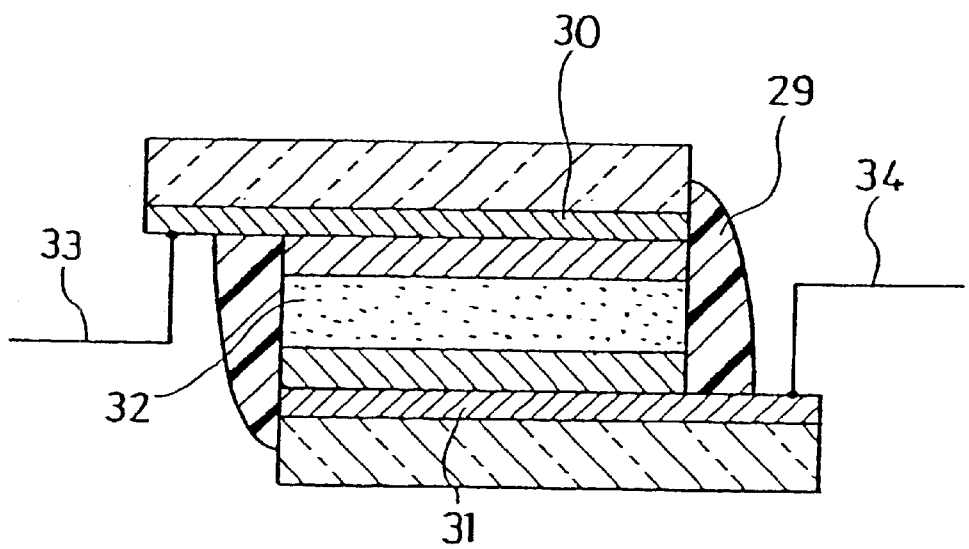
FIG. 12 is a cross sectional view of the electrochromic display device of one example of the present invention.

The counter electrode previously obtained was covered on the display electrode having the electrolyte layer thus obtained thereon so as to cover the electrolyte layer, and the solvent was volatilized under a reduced pressure. The cross section is shown in FIG. 12. In addition, the surface end was sealed with an ultraviolet cure resin 29 to provide the electrochromic display device. In FIG. 12, numeral 30 is the display electrode, numeral 31 is the counter electrode, numeral 32 is the electrolyte layer and numerals 33, 34 are lead terminals.

The electrochromic display device thus obtained was subjected to a cycle test in which a voltage of −1 V was applied on the display electrode to the counter electrode for two seconds to color the display electrode, and then a voltage of +1 V was applied for two seconds to eliminate the color. As a result, there was no decrease in performance even after 10000 cycles have passed, which made it possible to conduct coloring and eliminating the color.

As described hereinbefore, it has been found that according to the present invention, an electrochromic display device superior in cycle properties can be obtained.

In these examples, lithium ion conductive amorphous solid electrolytes such as $0.6Li_2S$-$0.4SiS_2$, $0.01Li_3PO_4$-$0.63Li_2S$-$0.36SiS_2$, $0.5Li_2S$-$0.5P_2S_5$ and $0.6Li_2S$-$0.4B_2S_3$ are described as lithium ion conductive inorganic solid electrolytes; however, it goes without saying that the same effects can be obtained by using those having a varied composition ratio of each of these solid electrolytes, those containing other sulfides not described in the Examples such as $Li_2S$—$GeS_2$, those containing other lithium halides such as $LiCl$—$Li_2S$—$SiS_2$ and $LiBr$—$Li_2S$—$P_2S_5$, those having a pseudo quarternary system such as $LiI$—$Li_2S$—$SiS_2$—$P_2S_5$ and $LiI$—$Li_3PO_4$—$Li_2S$—$PiS_2$, or other crystalline lithium ion conductive inorganic solid electrolytes which are not described in the Examples such as $Li_3N$, $Li_{1.3}Sc_{0.3}Ti_{1.7}(PO_4)_3$ and $Li_{0.2}La_{0.6}TiO_3$, and the present invention is not limited to those described in the examples as lithium ion conductive solid electrolytes.

Furthermore, in the examples of the present invention, a lithium cobalt oxide, a lithium nickel oxide, a lithium manganese oxide and a fluorinated graphite are described as the materials showing an electrochemical oxidation-reduction reaction in an electrolyte having lithium ion conductivity; however, it goes without saying that the same effects can be obtained by using a material showing an electrochemical oxidation-reduction reaction in other electrolytes having lithium ion conductivity which are not described in the Examples such as a copper oxide or an iron sulfide, and the present invention is not limited to those described in the Examples as the material showing an electrochemical oxidation-reduction reaction in an electrolyte having lithium ion conductivity.

In addition, in the Examples of the present invention, lithium batteries which use an electrolyte containing a mixed solvent of PC and DME, and $LiPF_6$ dissolved in the mixture solvent, or an electrolyte containing a mixture solvent of PC and DME, and $LiClO_4$ dissolved in the mixture solvent as the lithium ion conductive electrolyte are described; however, it goes without saying that the same effects can be obtained in the case where a supporting salt like $LiBF_4$ not described in the Examples is used or the case where an electrolyte using a solvent like ethylene carbonate not described in the Examples is used, and the present invention is not limited to the lithium batteries using those described in the Examples for the electrolyte.

Furthermore, in the Examples of the present invention those made of polyethylene mesh or glass fiber mesh only are described as the electronically insulating structural member; however, it goes without saying that the same effects can be obtained by using other materials including mesh such as polypropylene, polyester or cellulose, or nonwoven fabric of these materials instead of mesh, and the present invention is not limited to polyethylene mesh or glass fiber mesh as the electronically insulating structural member.

Moreover, in the Examples of the present invention those made of stainless steel only are described as the electronically insulating structural member; however, it goes without saying that the same effects can be obtained by using other materials including titanium mesh, or nonwoven fabric of these materials instead of mesh, and the present invention is not limited to those described in the Examples as the structural member.

INDUSTRIAL APPLICABILITY

As described hereinbefore, according to the present invention, it is possible to obtain a molded solid electrolyte having both high ionic conductivity and high workability, or a molded electrode having high electrode activity, and it is also possible to obtain an electrochemical device showing excellent activating properties by using the molded solid electrolyte and the molded electrode.

What is claimed is:

1. A molded solid electrolyte mainly composed of a polymer composition consisting of 50 to 100 wt % of 1,2-polybutadiene having a 1,2-vinyl bond content of 70% or more and a crystallinity of 5 to 50% and 0 to 50 wt % of a polar rubber, and a solid electrolyte.

2. The molded solid electrolyte in accordance with claim 1, wherein said solid electrolyte is a lithium ion conductive solid electrolyte.

3. The molded solid electrolyte in accordance with claim 1, wherein said solid electrolyte is an amorphous solid electrolyte.

4. The molded solid electrolyte in accordance with claim 3, wherein said amorphous solid electrolyte is a lithium ion conductive solid electrolyte.

5. The molded solid electrolyte in accordance with claim 4, wherein said lithium ion conductive amorphous solid electrolyte is mainly composed of a sulfide.

6. The molded solid electrolyte in accordance with claim 5, wherein said amorphous solid electrolyte contains silicon.

7. The molded solid electrolyte in accordance with claim 1, containing an electronically insulating structural member.

8. A molded electrode mainly composed of a polymer composition consisting of 50 to 100 wt % of 1,2-polybutadiene having a 1,2-vinyl bond content of 70% or more and a crystallinity of 5 to 50% and 0 to 50 wt % of a polar rubber, and an electrode active material.

9. The molded electrode in accordance with claim 8, wherein said molded electrode contains a lithium ion conductive inorganic solid electrolyte.

10. The molded electrode in accordance with claim 9, wherein said lithium ion conductive inorganic solid electrolyte is an amorphous solid electrolyte mainly composed of a sulfide.

11. The molded electrode in accordance with claim 8, wherein said molded electrode contains a structural member.

12. The molded electrode in accordance with claim 11, wherein said structural member is electron conductive.

13. An electrochemical device comprising a pair of electrodes and an electrolyte layer, characterized in that at least one of said pair of electrodes and said electrolyte layer contains a polymer composition consisting of 50 to 100 wt % of 1,2-polybutadiene having a 1,2-vinyl bond content of 70t or more and a crystallinity of 5 to 50%, and 0 to 50 wt % of a polar rubber.

* * * * *